United States Patent
Wong et al.

(10) Patent No.: US 12,200,722 B2
(45) Date of Patent: Jan. 14, 2025

(54) COMMUNICATIONS DEVICE, INFRASTRUCTURE EQUIPMENT AND METHODS

(71) Applicant: Sony Group Corporation, Tokyo (JP)

(72) Inventors: Shin Horng Wong, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 482 days.

(21) Appl. No.: 17/606,763

(22) PCT Filed: Apr. 22, 2020

(86) PCT No.: PCT/EP2020/061237
§ 371 (c)(1),
(2) Date: Oct. 27, 2021

(87) PCT Pub. No.: WO2020/224969
PCT Pub. Date: Nov. 12, 2020

(65) Prior Publication Data
US 2022/0225400 A1     Jul. 14, 2022

(30) Foreign Application Priority Data

May 3, 2019 (EP) ..................................... 19172653

(51) Int. Cl.
*H04W 72/14* (2009.01)
*H04L 1/18* (2023.01)
(Continued)

(52) U.S. Cl.
CPC .......... *H04W 72/23* (2023.01); *H04L 1/1812* (2013.01); *H04W 72/0446* (2013.01); *H04W 72/56* (2023.01)

(58) Field of Classification Search
CPC ... H04W 28/04; H04W 72/04; H04W 72/042; H04W 88/08; H04W 72/23; H04W 72/56;
(Continued)

(56) References Cited

U.S. PATENT DOCUMENTS

2014/0161084 A1\* 6/2014 Yang ..................... H04W 72/23
370/329
2014/0219202 A1\* 8/2014 Kim ...................... H04L 5/0055
370/329
(Continued)

FOREIGN PATENT DOCUMENTS

CN          108293248 A  \*  7/2018  .......... H04L 1/1819
CN          109600212 A  \*  4/2019  .......... H04L 1/1812
(Continued)

OTHER PUBLICATIONS

3GPP TSG RAN WG1 #96bis, Xi'an, China, Apr. 8-12, 2019, R1-1904146, Source: ZTE, Title: On scheduling/HARQ enhancements for NR URLLC, Agenda item: 7.2.6.4. (Year: 2019).\*
(Continued)

*Primary Examiner* — Peter G Solinsky
*Assistant Examiner* — Sanjay K Dewan
(74) *Attorney, Agent, or Firm* — XSENSUS LLP

(57) ABSTRACT

A communications device operates to receive data from a wireless communications network. The communications device receives one or more downlink control messages providing indicating a first downlink communications resource of a wireless access interface provided by the wireless communications network from which the communications device can receive first downlink data, and indicating a second downlink communications resource of the wireless access interface from which the communications device can receive second downlink data, and indicating one or more uplink communications resources of the wireless
(Continued)

access interface for the communications device to transmit one or more Hybrid Automatic Repeat Request-type (HARQ) feedback messages for indicating whether or not the first and second downlink data is received.

20 Claims, 19 Drawing Sheets

(51) Int. Cl.
| | |
|---|---|
| *H04L 1/1812* | (2023.01) |
| *H04W 72/04* | (2023.01) |
| *H04W 72/0446* | (2023.01) |
| *H04W 72/10* | (2009.01) |
| *H04W 72/23* | (2023.01) |
| *H04W 72/56* | (2023.01) |

(58) Field of Classification Search
CPC . H04W 72/0446; H04W 72/14; H04W 72/10; H04L 5/0007; H04L 1/1812
USPC .......................................................... 370/329
See application file for complete search history.

(56) References Cited

U.S. PATENT DOCUMENTS

| | | | | |
|---|---|---|---|---|
| 2015/0180625 A1* | 6/2015 | Park | ...................... | H04L 5/0035 |
| | | | | 370/329 |
| 2018/0034596 A1 | 2/2018 | Noh | | |
| 2018/0368168 A1 | 12/2018 | Jung | | |
| 2019/0103943 A1* | 4/2019 | Wang | ..................... | H04L 1/1854 |
| 2019/0150181 A1* | 5/2019 | Kim | ...................... | H04L 1/1896 |
| | | | | 370/329 |
| 2019/0363843 A1* | 11/2019 | Gordaychik | ............... | H04L 1/08 |
| 2022/0045805 A1* | 2/2022 | Karaki | ................... | H04L 1/1864 |
| 2022/0046677 A1* | 2/2022 | Talarico | ................ | H04W 72/23 |
| 2023/0319848 A1* | 10/2023 | Zhou | ..................... | H04L 1/1896 |
| | | | | 370/329 |

FOREIGN PATENT DOCUMENTS

| | | | | |
|---|---|---|---|---|
| CN | 109672506 A * | 4/2019 | ........... | H04L 1/1812 |
| EP | 3 754 876 A1 * | 12/2020 | ............... | H04L 1/18 |
| WO | WO-2017144262 A1 | 8/2017 | | |
| WO | WO-2018127421 A1 | 7/2018 | | |
| WO | WO 2018/204491 A1 * | 11/2018 | ............... | H04L 1/16 |
| WO | WO 2018/236117 A1 * | 12/2018 | ........... | H04L 1/1812 |

OTHER PUBLICATIONS

3GPP TSG RAN WG1 #96bis, Xi'an, China, Apr. 8-12, 2019, R1-1904084, Source: vivo, Title: Enhancements for Scheduling/HARQ, Agenda Item: 7.2.6.4. (Year: 2019).*
3GPP TSG RAN WG1 #96bis, Xi'an, China, Apr. 8-12, 2019, R1-1904306, Source: Intel Corporation, Title: On enhancements to UCI for eURLLC, Agenda item: 7.2.6.2. (Year: 2019).*
3GPP TSG RAN WG1 #96bis, Xi'an, China, Apr. 8-12, 2019, R1-1905105, Agenda item: 7.2.6.4, Source: Institute for Information Industry (III), Title: Enhancements to HARQ for eURLLC. (Year: 2019).*
International Search Report and Written Opinion mailed on Jun. 29, 2020, received for PCT Application PCT/EP2020/061237, Filed on Apr. 22, 2020, 13 pages.
Nokia et al., "Revised SID: Study on NR Industrial Internet of Things (Iot)", 3GPP TSG RAN meeting #81, RP-182090, Sep. 10-13, 2018, 5 pages.
Holma et al., "LTE for UMTS OFDMA and SC-FDMA Based Radio Access", John Wiley & Sons, 2009, pp. 25-27.
3GPP, "NR; Medium Access Control (MAC) Protocol Specification (Release 15)", 3GPP TS 38.321 v15.3.0, Sep. 2018, pp. 1-76.
3GPP, "NR; Physical layer Procedures for Data (Release 15)", 3GPP TS 38.214 V15.2.0, Jun. 2018, pp. 1-94.
3GPP, "LS on Intra-UE Prioritization/Multiplexing", 3GPP TSG-RAN WG2 Meeting #104, R2-1818795, Nov. 12-16, 2018, 2 pages.
Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.
Huawei et al., "New WID: Physical Layer Enhancements for NR Ultra-Reliable and Low Latency Communication (URLLC)" 3GPP TSG RAN Meeting #83, RP-190726, Mar. 18-21, 2019, 5 pages.
3GPP, "Study on physical layer enhancements for NR ultra-reliable and low latency case (URLLC) (Release 16)", 3GPP TR 38.824, v1.2.0, Mar. 2019, pp. 1-84.
ZTE, "On scheduling/HARQ enhancements for NR URLLC", 3GPP TSG RAN WG1 #96bis, R1-1904146, Apr. 8-12, 2019, pp. 1-7.
Vivo, "Enhancement for Scheduling/HARQ", 3GPP TSG RAN WG1 #96bis, R1-1904084, Apr. 8-12, 2019, pp. 1-8.
Intel Corporation, "On enhancements to UCI for eURLLC", 3GPP TSG RAN WG1 #96bis, R1-1904306, Apr. 8-12, 2019, pp. 1-9.
Institute for Information Industry (III), "Enhancements to HARQ for eURLLC", 3GPP TSG RAN WG1 #96bis, R1-1905105, April, 8-12, 2019, pp. 1-5.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2020/061237, filed Apr. 22, 2020, which claims priority to EP 19172653.8, filed May 3, 2019, the entire contents of each are incorporated herein by reference.

BACKGROUND

Field

The present disclosure relates to communications devices, infrastructure equipment and methods of receiving downlink data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new Radio Access Technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

An increasing diversity of different types of services being supported by communications devices requires consideration of a more complicated interaction of resources allocated for receiving downlink data using automatic repeat request type protocols.

SUMMARY

The present disclosure can help address or mitigate at least some of the issues discussed above.

Embodiments of the present technique can provide a method of receiving data by a communications device in a wireless communications network. The method comprises receiving one or more downlink control messages indicating a first downlink communications resource of a wireless access interface from which the communications device can receive first downlink data, the one or more downlink control messages also indicating a second downlink communications resource of the wireless access interface from which the communications device can receive second downlink data, and indicating one or more uplink communications resources of the wireless access interface for the communications device to transmit one or more Hybrid Automatic Repeat Request-type (HARQ) feedback messages for indicating whether or not the first and/or second downlink data is received. The method further comprises detecting that the first downlink communications resource and the second downlink communications resource of the wireless access interface overlap in time, and if they do, applying one or more predetermined criteria to determine whether the communications device can transmit a HARQ feedback message for one or both of the first downlink data from the first communications resource and the second downlink data from the second communications resource. The communications device receives one or both of the first downlink data from the first communications resource and the second downlink data from the second communications resource and transmits one HARQ feedback which has been determined from the one or more predetermined criteria can be received. The first and/or second downlink data can be received independently of which of the HARQ feedback messages can be transmitted. The method further comprises transmitting the determined HARQ feedback message in the uplink communications resource to indicate whether or not one of the corresponding first and the second downlink was received.

Embodiments of the present technique can therefore provide a method of operating a communications device or a communications device configured to transmit HARQ feedbacks to downlink data received from different downlink resources of a shared channel which overlap in time. The downlink data is communicated using an automatic repeat request technique such as a Hybrid ARQ technique. The communications device receives one or more downlink control messages indicating the different downlink communications resources for receiving the downlink data with an indication of resources of one or more uplink control channel for transmitting HARQ feedback messages indicating whether the downlink data was received respectively from each granted resource of a downlink shared channel. The communications device detects that the downlink resources granted for receiving transport blocks, which may be to support different services overlap in time. This detection triggers the communications device to apply one or more criteria or rules to determine whether the communications device can transmit HARQ feedbacks for the downlink data from the overlapping downlink communications resources. In other examples the communications device applies the one or more predetermined criteria without detecting that the downlink communications resources overlap. The communications device may be capable of receiving the downlink data from both of the overlapping granted downlink resources. However the one or more criteria may determine that the communications device cannot transmit the HARQ feedback for both of the granted downlink communications resources, based for example on a location in time of the corresponding uplink resources for transmitting the respective HARQ feedback messages, a type of codebook used to form the HARQ feedback messages or whether the overlapping downlink resources are allocated to the same shared channel receiving occasion. Accordingly, after applying the one or more criteria the communications device can transmit a HARQ feedbacks corresponding to the transport blocks transmitted on one of the granted downlink communications resources. Furthermore the communications device can in some examples provide a HARQ feedback message for the transport block transmitted on the downlink communications resources, even if the corresponding uplink control channels overlap in time, by adapting the HARQ feedback message which is transmitted. The wireless communications network can also determine that the communications device will transmit HARQ feedback for one of the selected transport blocks and take appropriate action including providing uplink resources for the HARQ feedback of the unacknowledged transport block in another uplink control channel occasion.

As will be appreciated from the following description, embodiments of the present technique can be applied to examples in which a single allocation of an uplink resource is granted for transmitting a plurality of HARQ feedback messages or to examples in which there is a plurality of allocations of uplink resource granted, each of which is used to transmit a HARQ feedback message.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
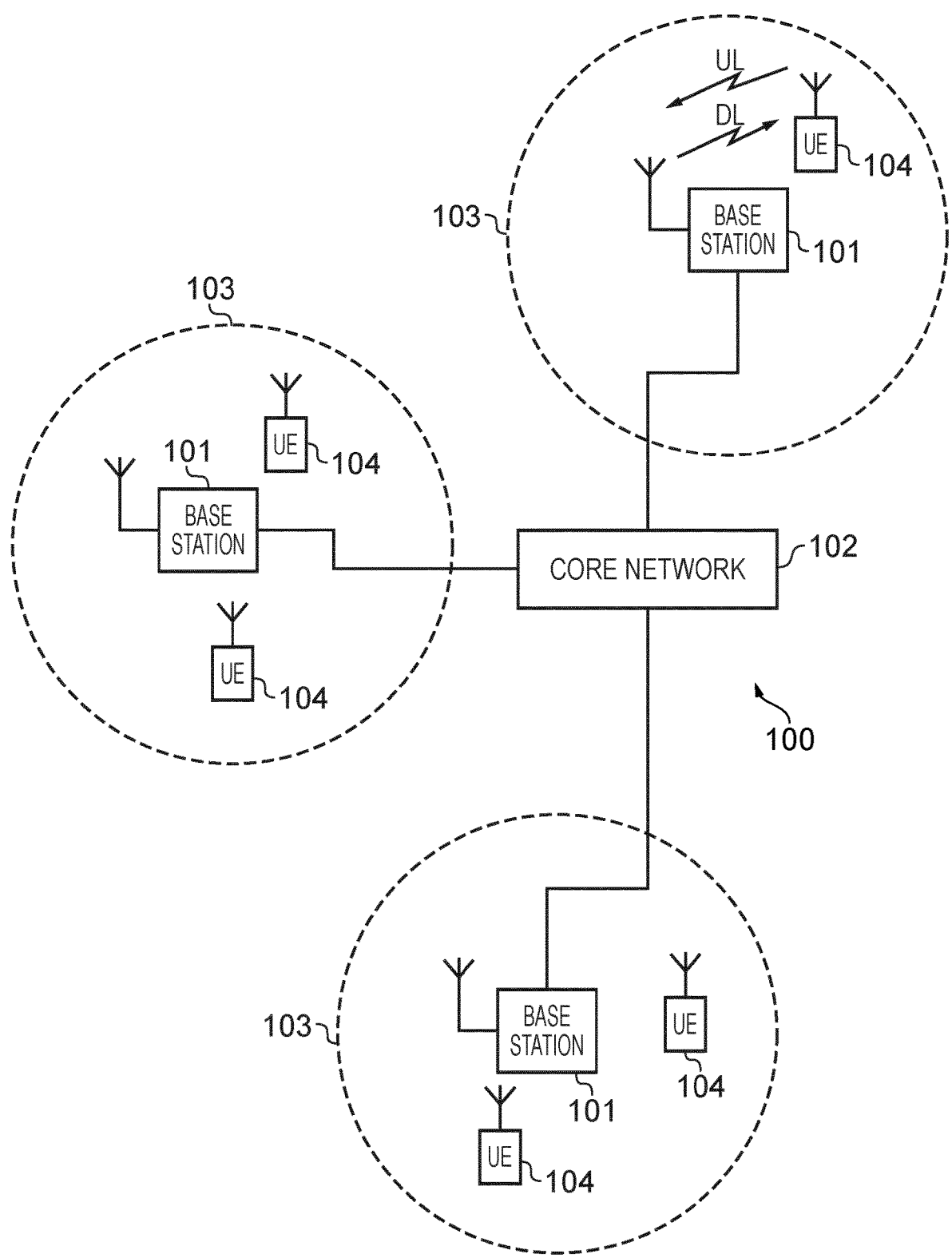
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
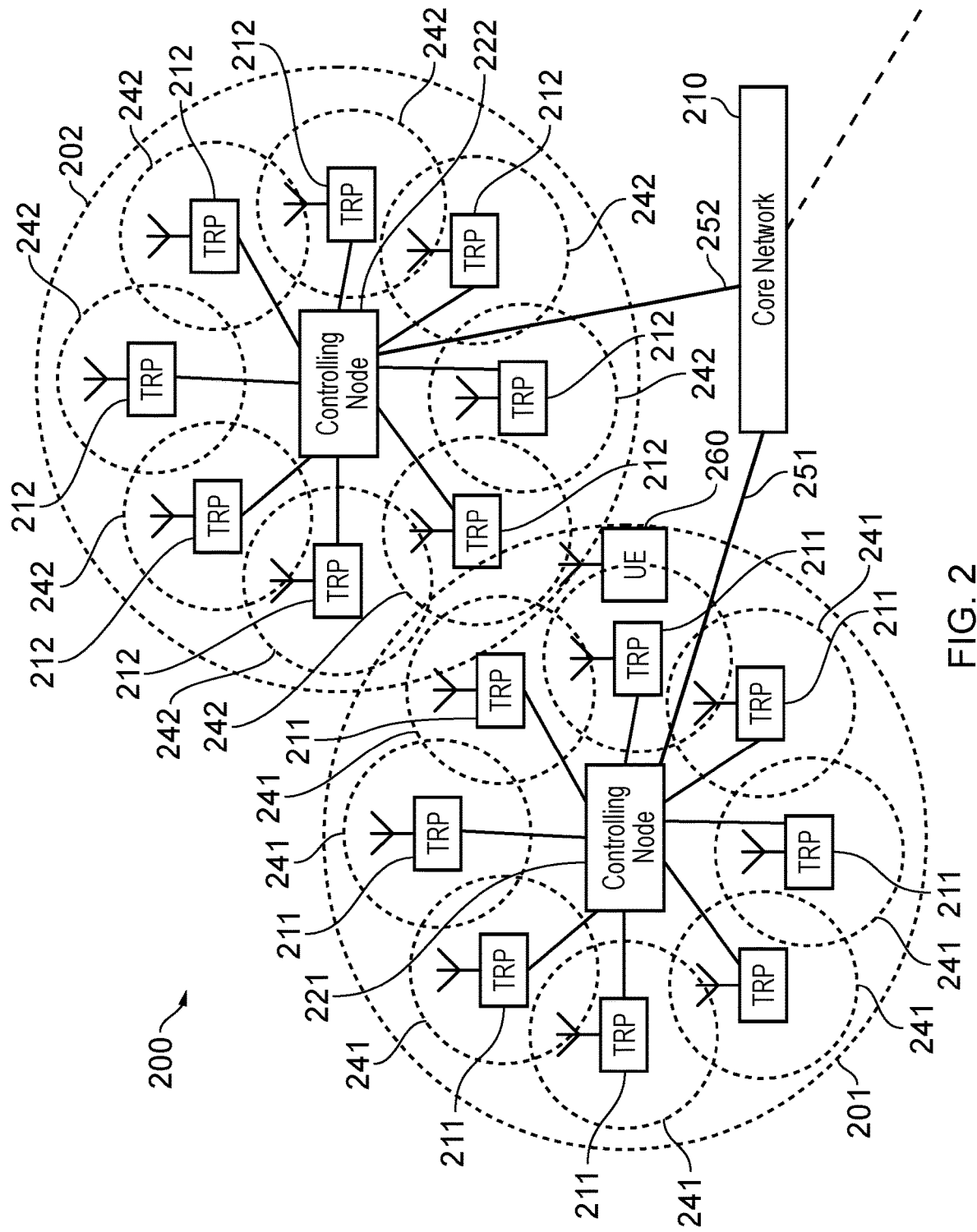
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new Radio Access Technology (RAT) wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communications cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
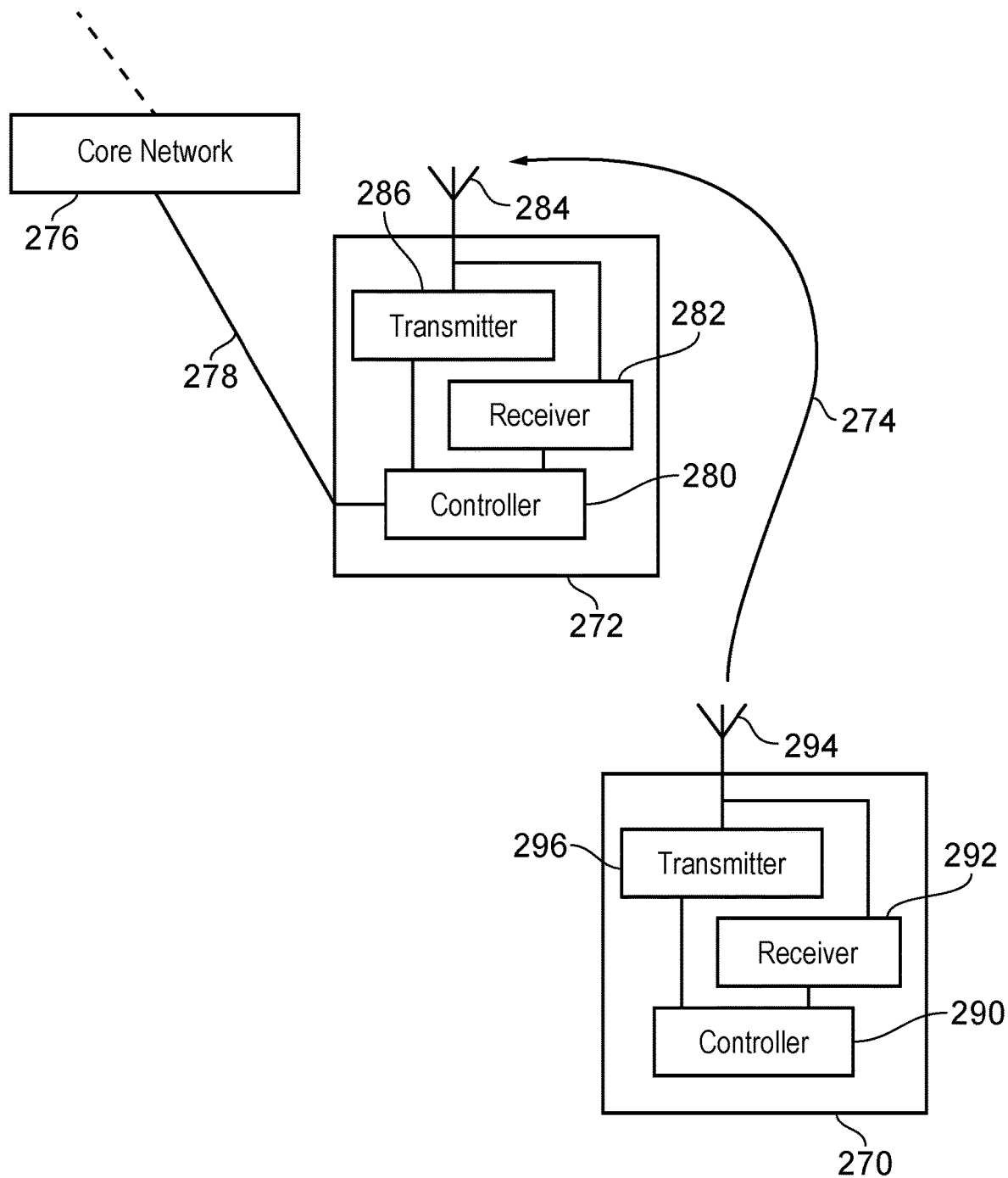
FIG. 3 is a schematic block diagram of an example infrastructure equipment and communications device which may be configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to receive downlink data to the infrastructure equipment 272 via resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [5] services are for a reliability of $1\text{-}10^{-5}$ (99.999%) or higher for one transmission of a 32 byte packet with a user plane latency of 1 ms [3]. In some scenarios, there may be a requirement for a reliability of $1\text{-}10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [9].

URLLC services are required in order to meet the requirements for IIoT, which require high availability, high reliability, low latency, and in some cases, high-accuracy positioning [1]. Some IIoT services may be implemented by using a mixture of eMBB and URLLC techniques, where some data is transmitted by eMBB and other data is transmitted by URLLC. The mix of services being transmitted via the same wireless access interface can create new challenges for a wireless communications network which is configured to operate as efficiently as possible.

Figure 17:
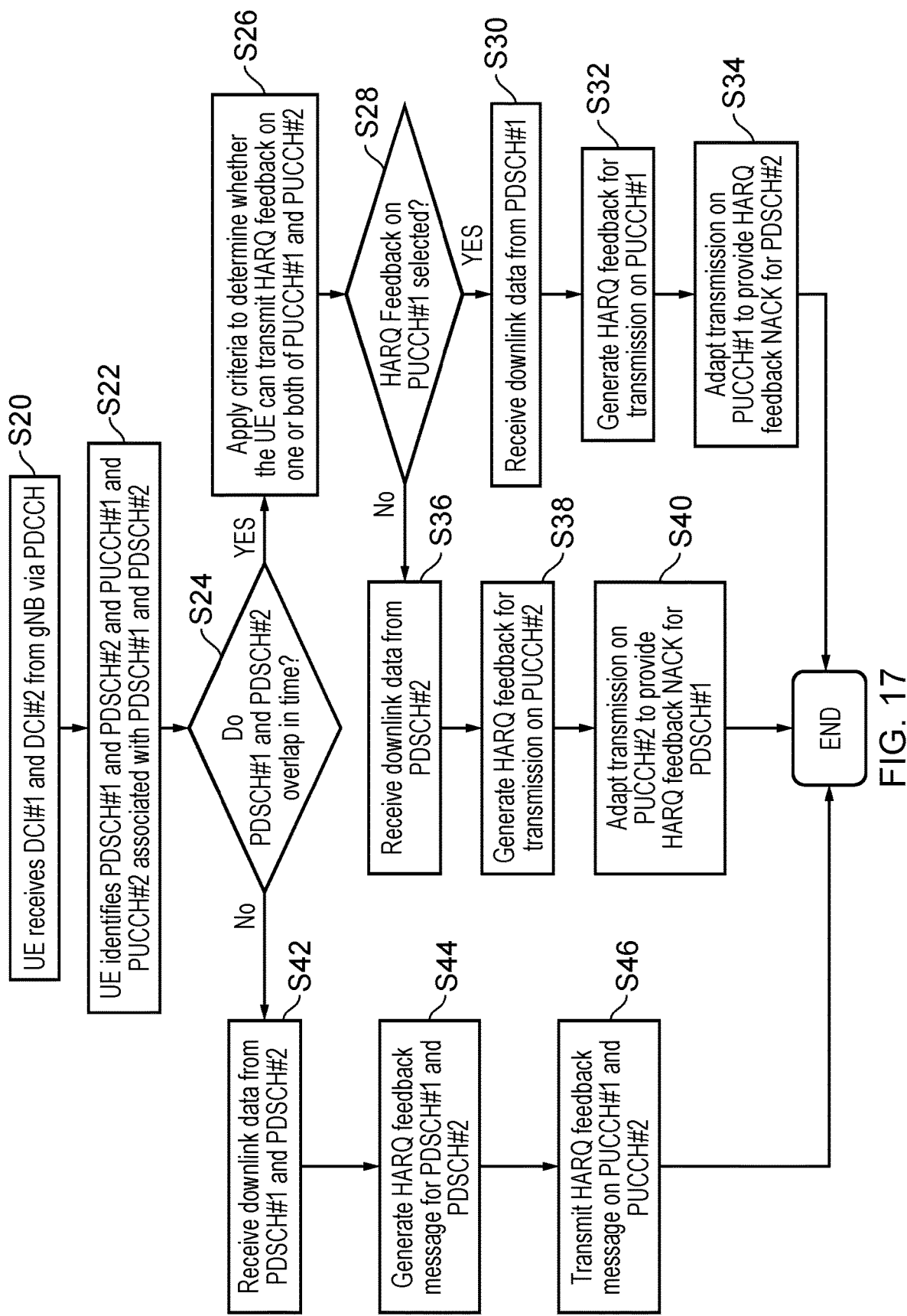
FIG. 17 is another flow diagram providing an example operation of a communications device (UE) according to another example embodiment.
Figure 18:
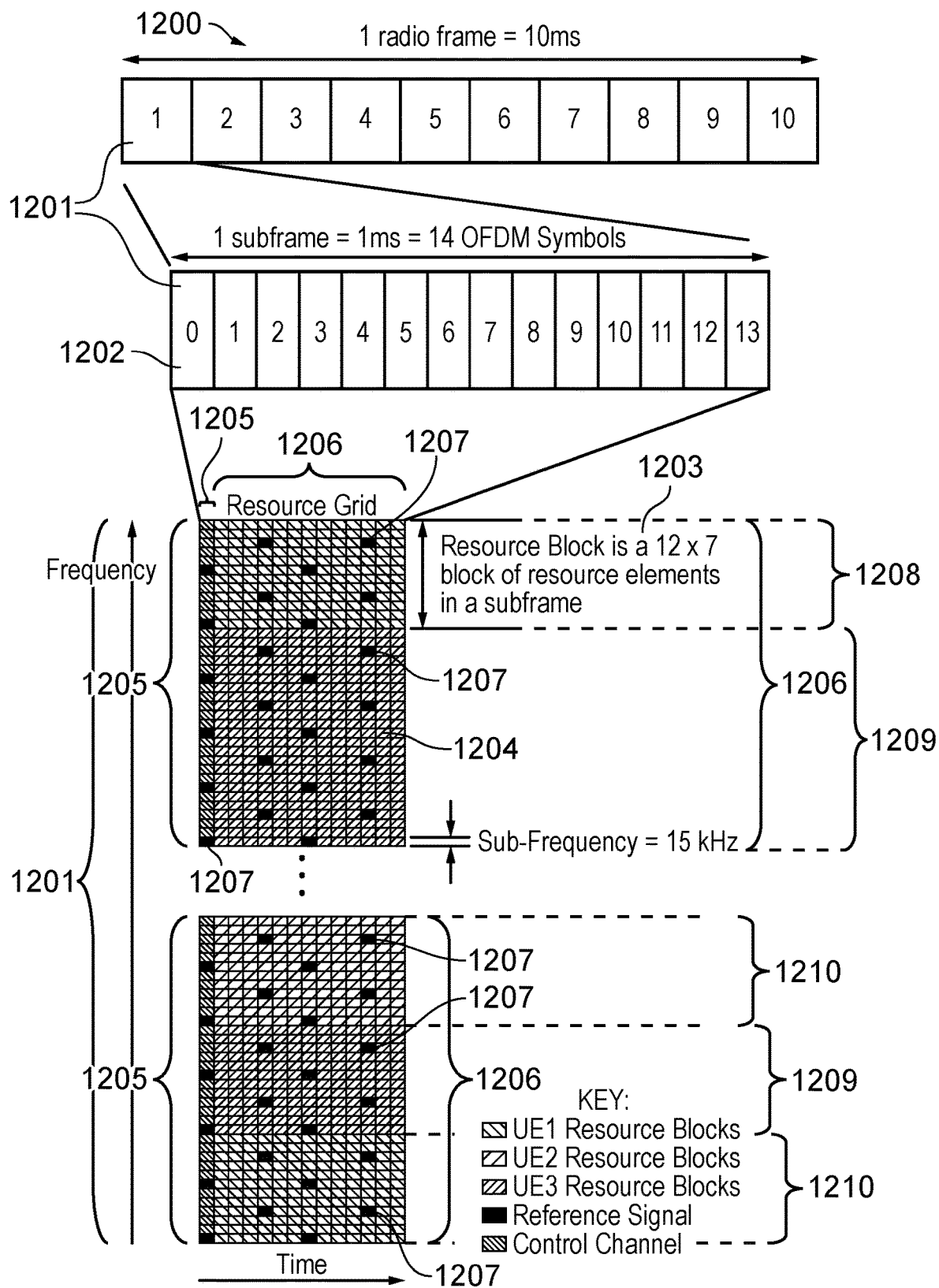
FIG. 18 is a schematic representation of a downlink of a wireless access interface according to the 3GPP LTE standard.

Embodiments of the present technique described below relate to transmitting HARQ feedback messages for downlink data at a communications device in accordance with an automatic repeated request-type protocol such as a Hybrid Automatic Repeat Request (HARQ) type protocol. A better appreciation of the following example embodiments can be gained from reviewing a proposed wireless access interface according to 3GPP LTE/4G and NR/5G. A wireless access interface in accordance with a 3GPP Standard for LTE is described in detail in Annex 1 in which FIGS. 17 and 18 provide detailed representation of a wireless access interface for the downlink and the uplink respectively. More details of the LTE wireless access interface are therefore described in Annex 1. However it will be appreciated that the wireless access interface provides physical communications resources including shared channels for both uplink and the downlink which may be accessed by communicating appropriate control signalling as those acquainted with LTE will appreciate. Equally a wireless access interface for the 5G Standard as represented in FIG. 2 may be similarly formed in accordance with the arrangement shown in Annex 1 and may use OFDM on the downlink and OFDM or SC-FDMA on the uplink.

Figure 4:
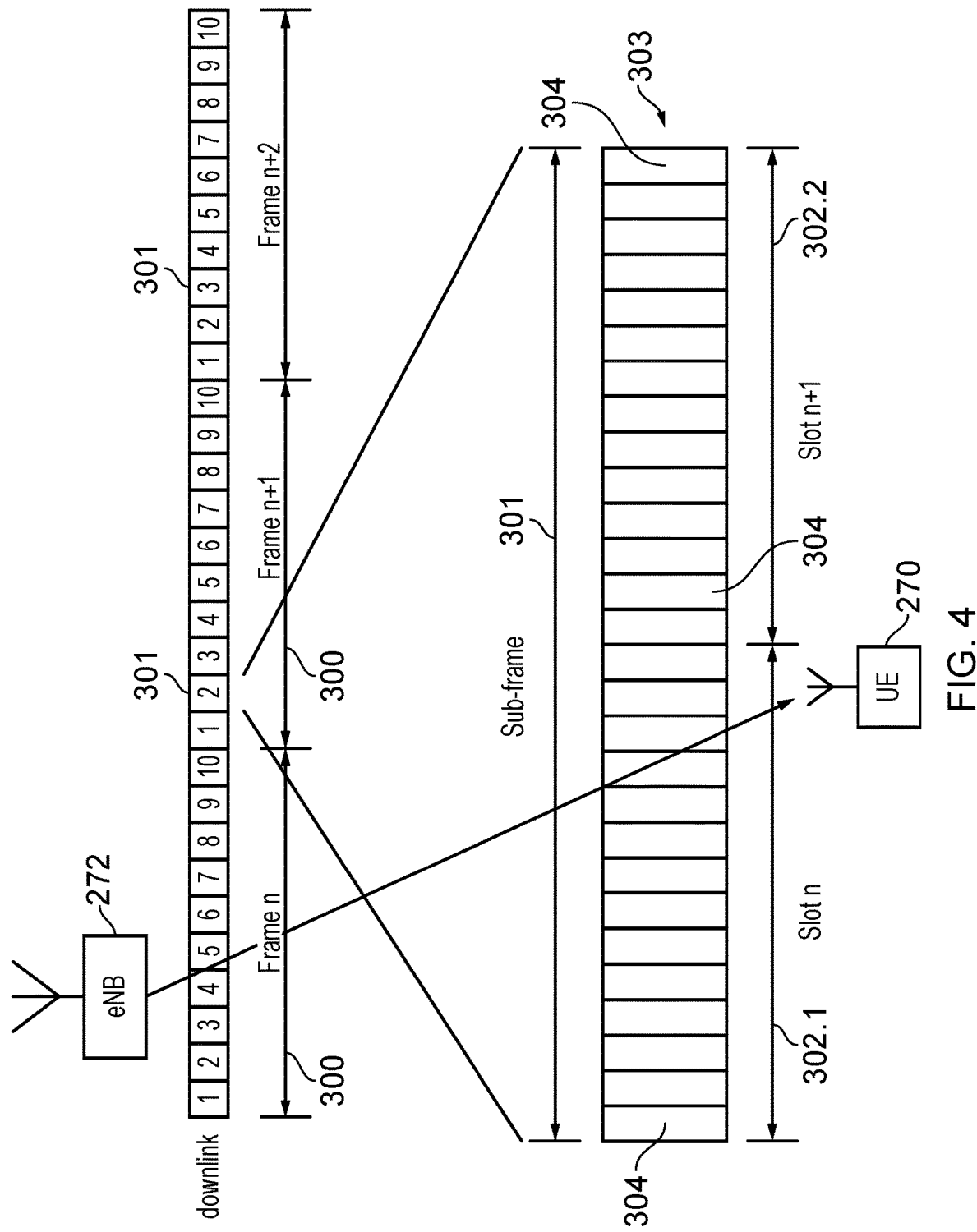
FIG. 4 is a schematic illustration of a simplified representation of a downlink of a wireless access interface shown in FIG. 18 illustrating a frame, sub-frame and time slot structure of time divided units of the wireless access interface.
Figure 15:
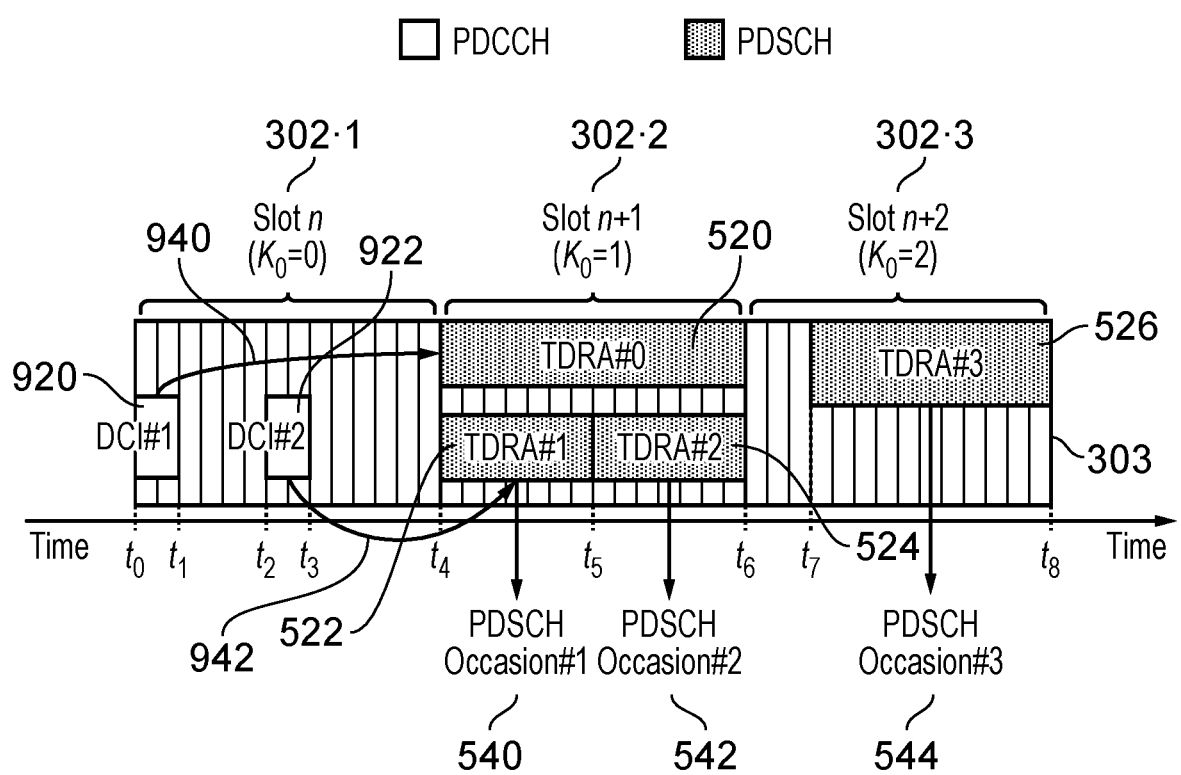
FIG. 15 is a schematic representation of three time slots of the downlink in which two downlink control information messages grant four allocations of communications resources of the downlink shared channel which are grouped into three shared channel occasions, two of the shared channel resource allocations overlapping in time being granted by the two different downlink control information messages.

FIG. 4 provides a simplified representation of a downlink structure of a wireless access interface with time divided units which may be used for a NR wireless access interface structure. Whilst the terms "frames" and "sub-frames" used in FIG. 4 are terms which have been used in LTE, 3GPP standards adopted for 5G/NR may be different and so it will be appreciated that FIG. 4 is provided for illustration only to assist in the explanation of the example embodiments. Current proposals for a time divided structure for 5G/NR include that one slot providing a time divided structure of the wireless access interface consists of 14 OFDM symbols 304, and one sub-frame is defined by 1 ms. The term slot is used in this description to refer to a time slot or time divided unit and time slot and slot may be used interchangeably. As such, the time divided structure of the wireless access interface of FIG. 4 shows an example in case of 30 kHz carrier spacing, so that one sub-frame 301 has two slots 302.1, 302.2 and twenty eight symbols. As shown in FIG. 4, the downlink of the wireless access interface is shown to comprise frames 300 with respect to which the UE 270 receives downlink data from the infrastructure equipment 272. Consistent with the explanation provided in Annex 1, the downlink comprises in each frame 300 ten sub-frames 301. A frame 300 is defined by 10 ms, a sub-frame 301 is defined by 1 ms, and a slot 302 is defined by fourteen OFDM symbols 304, irrespective of subcarrier spacing. In FIG. 4, 30 kHz subcarrier spacing is assumed. An expanded view of the components of a sub-frame 301 are shown to be formed from two consecutive slots n−1, n 302.1, 302.2, which include physical resources of a shared channel as well as control channels as explained in Annex 1 with reference to FIG. 15.

Hybrid Automatic Repeat Request (HARQ) Feedback

Data may be transmitted by the communications device 104, using uplink communications resources, or by the infrastructure equipment 101, using downlink communications resources. Data may be transmitted within Medium Access Control (MAC) transport blocks. Each MAC transport block is constructed at the MAC protocol layer (such as, in the UE 270, at the MAC protocol layer 302).

Each MAC transport block may comprise, or be transmitted together with error check bits, which permit the receiver of the MAC transport block to determine whether the MAC transport block has been received and decoded without error (i.e. 'correctly' or 'successfully' received).

Improved data transmission reliability may be realised by the use of HARQ-acknowledgement (ACK) information (so-called HARQ feedback message or ACK/NACK) transmitted by the recipient of the data to the transmitter. The HARQ-ACK information may comprise an indication of an acknowledgement status for one or more portions of data. The acknowledgement status for a portion of data (such as data received in a given MAC TB) may indicate whether that data has/have been received in error, or has not been received at all.

In response to receiving the HARQ-ACK information, the data transmitter may retransmit data which has not been successfully received by the receiver. This process may be repeated as many times as necessary until all the data has been successfully conveyed to the intended recipient.

A HARQ process may operate 'synchronously' or 'asynchronously'. According to a synchronous HARQ process, the relative timing of data transmission and the transmission of corresponding HARQ-ACK information is fixed according to predetermined parameters for the HARQ process.

A communications device may operate multiple HARQ processes in parallel, and these may be offset in time. For example, a data block associated with one HARQ process may be being received from the infrastructure equipment, a further data block may be being decoded to determine whether it has been received without error or not, and yet in respect of a further data block, acknowledgement information may have been recently transmitted to the infrastructure equipment and the communications device may be expecting to receive a retransmission of that further data block.

Embodiments of the present technique may find application in scenarios where the HARQ processes are synchronous or asynchronous.

In accordance with some conventional HARQ techniques, a retransmission of data may be encoded in a different manner to that used for a previous transmission of the same data. Additionally or alternatively, a receiver may store information (such as 'soft bits' generated as part of a decoding process) corresponding to an earlier transmission of the same data, and may use this information to improve the probability of successfully decoding the data after the subsequent retransmission.

In response to receiving data successfully or unsuccessfully (i.e. where it is determined that one or more errors are present) the corresponding acknowledgement status for that data may be updated. When HARQ-ACK information is subsequently generated for transmission, that HARQ-ACK information may take into account the updated acknowledgement status for that data.

According to various proposals, HARQ-ACK information may be generated and transmitted independently in respect of data associated with different services (or service types) and/or logical channels. For example, HARQ-ACK information relating to URLLC data may be generated and transmitted independently of HARQ-ACK information relating to eMBB data. In particular, uplink communications resources for the transmission of ACK data associated with different service types may be allocated independently.

A HARQ procedure may operate independently of the logical channels associated with the data being transmitted and acknowledged. For example, one transport block may carry data associated with multiple logical channels. A single acknowledgement status (ACK/NACK) may be determined for such a transport block.

Uplink communications resources for the transmission of acknowledgement information may occur less frequently than the transmission of downlink data. Therefore, there may arise a need for HARQ-ACK information transmitted using a given instance of uplink communications resources to convey the acknowledgement status corresponding to multiple downlink data transmissions and their respective MAC Transport Blocks.

Uplink communications resources for the transmission of acknowledgement information may be explicitly allocated by the infrastructure equipment. For example, downlink control information (DCI) indicating downlink communications resources for the transmission of downlink data may additionally comprise an indication of allocated uplink communications resources for the transmission of acknowledgement information.

Additionally or alternatively, the communications device 104 may determine uplink communications resources for transmitting acknowledgement information implicitly based on allocated downlink communications resources. Such uplink communications resources may be said to be 'implicitly' allocated.

Figure 5:
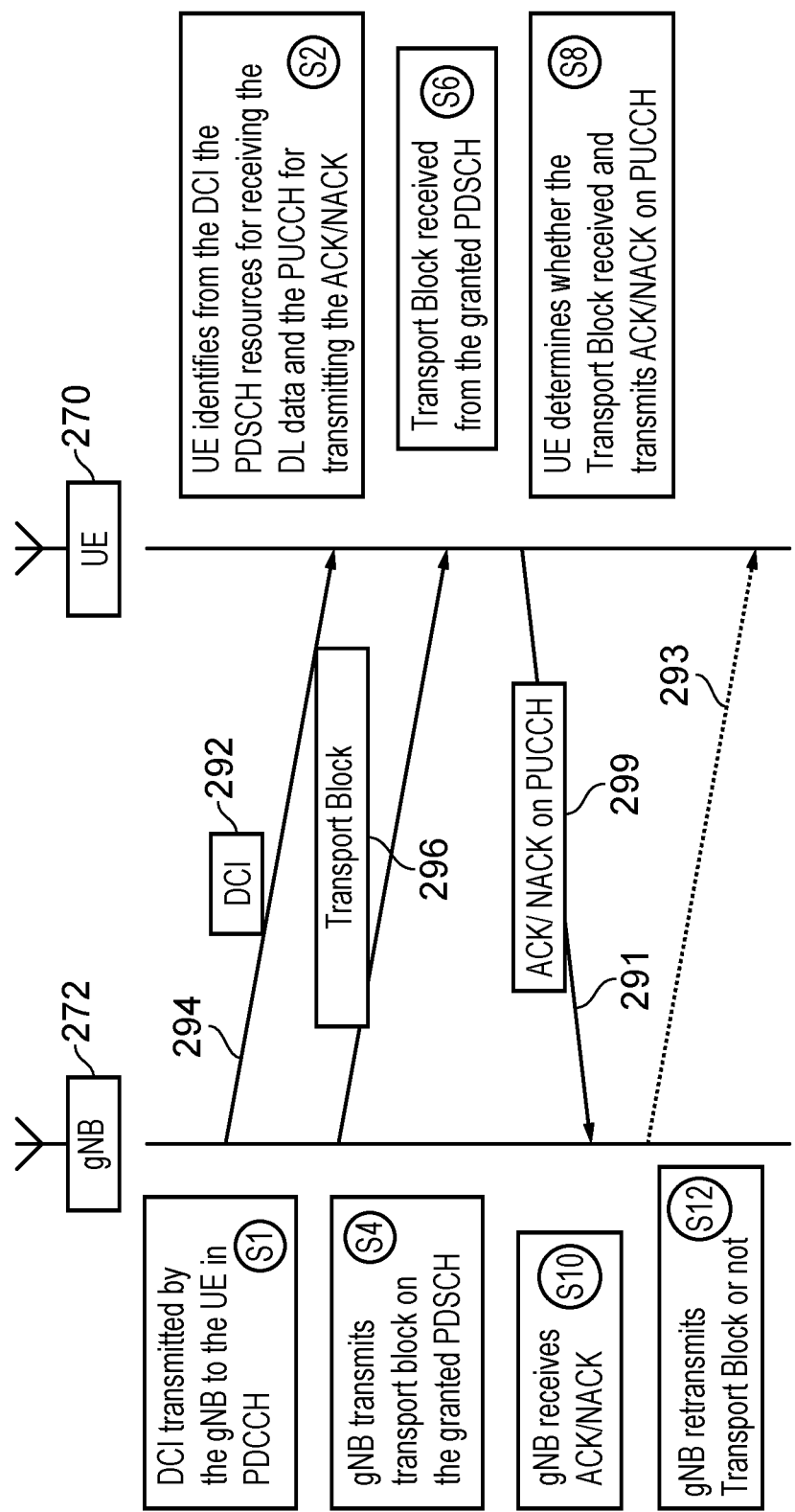
FIG. 5 is a part schematic part flow diagram illustrating operations and transmissions by a communications device and an infrastructure equipment via a wireless access interface of a wireless communications network when performing an automatic repeat request type protocol (HARQ or the like)

FIG. 5 provides a part schematic part flow diagram illustrating operations performed by the UE 270 and the gNB 272 to communicate downlink data from the gNB to the UE in accordance with an HARQ process. As shown in FIG. 5, the gNB 272 in the first process step S1 transmits Downlink Control Information (DCI) 292 as represented by an arrow 294 to the UE 270 via a PDCCH. In process step S2 the UE identifies from the DCI the communications resources of the downlink share channel (PDSCH) for receiving the downlink data from the gNB. The UE 270 also identifies from the DCI the uplink resources granted in the PUCCH for the UE to transmit an HARQ feedback message as an ACK/NACK for receiving the downlink data. In process step S4 the gNB transmits a transport block in the granted PDSCH resources as represented by a block 296 and an arrow 298. At process step S6 the UE 270 then receives the transport block in the granted PDSCH resources, which were indicated by the DCI 292. In process step S8 the UE 270 determines whether the transport block 296 has been received correctly and transmits an ACK or NACK as an HARQ feedback message on the PUCCH resources granted by the gNB 272 identified from the DCI 292. The UE 270 then transmits the ACK/NACK on the PUCCH as represented by a block 299 and an arrow 291. In the process step 2S10 the gNB receives the HARQ feedback message as an ACK/NACK and at process step S12 the gNB determines whether it should retransmit the transport block or not as represented by an arrow 293. As can be seen from FIG. 5, the gNB provides an indication in the DCI 292 of the uplink resources of the PUCCH in which the HARQ ACK/NACK are to be transmitted. The following paragraphs provide a more detailed explanation of how the HARQ feedback messages are generated.

HARQ Codebook

The Downlink Control Information (DCI), which provides a grant of downlink resources (e.g. DCI format 1_0 and 1_1) for a Physical Downlink Shared Channel (PDSCH) also contains a PDSCH-to-HARQ_feedback field which indicates a time location of resource of the uplink in for example a PUCCH where a HARQ ACK/NACK feedback message corresponding to the Transport Block (TB) transmitted in the PDSCH is to be transmitted by the UE. The PDSCH-to-HARQ_feedback is a three bit indication in the DCI providing a $K_1$ value, where $K_1$ is a number of slots after the PDSCH transmission where the uplink resources of the PUCCH are provided for transmitting the ACK/NACK. Multiple PDSCHs can share a single PUCCH, i.e. the $K_1$ for each PDSCH points to the same slot and the HARQ feedback message for these PDSCHs are multiplexed into a single PUCCH using a HARQ codebook and are transmitted using the single PUCCH. The PDSCHs corresponding to the HARQ feedback messages that can be multiplexed in a HARQ codebook are within a time multiplexing window where the size of this codebook Multiplexing Window (Mux Window) is defined by a maximum $K_1$ value. It has been previously proposed to provide two types of HARQ "codebooks" for PDSCH HARQ feedback messages, which are known as Type 1 and Type 2 HARQ codebooks. A HARQ codebook is a list of possible codewords where each codeword is an encoded information bit representing a specific combination of ACK/NACKs. For example, a codebook for two HARQ feedback messages can have four ( ) combinations, i.e. {ACK, ACK}, {ACK, NACK}, {NACK, ACK} &

{NACK, NACK}, each of these combinations can be encoded into a codeword which can be longer than 2 bits, e.g. a codeword=10101010 can represent {ACK, ACK} and another codeword=01010101 can represent {NACK, NACK}. These codewords can be selected such that they have large Hamming distances among them to reduce error cause by any of the bit in the codeword being wrong. The type 1 and type 2 HARQ codebooks will be explained in the following paragraphs:

Type 1 HARQ Codebook

A Type 1 HARQ codebook is a semi-static codebook where the number of HARQ ACK/NACKs feedbacks in the codebook is fixed. That is to say that the size of the codebook is configured using Radio Resource Control (RRC) signalling, and the size depends on the number of PDSCH occasions or PDSCH transmission opportunities within a given multiplexing window (Mux Window). An example is shown in FIG. 6.

Figure 6:
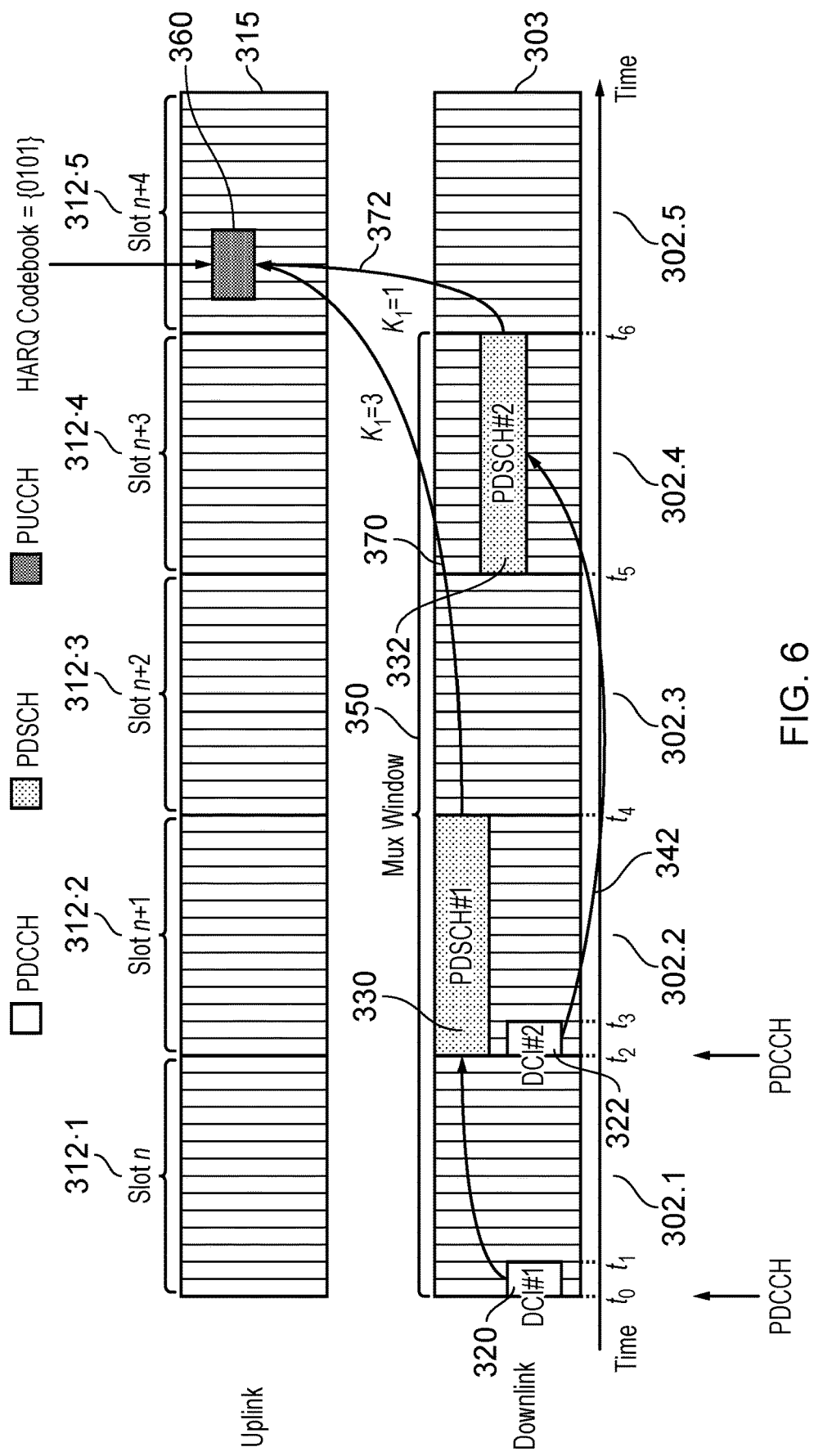
FIG. 6 is a schematic representation of five slots of an uplink and a downlink of the wireless access interface of FIG. 5 illustrating a grant of downlink communications resources on a shared channel and uplink communications resources on a control channel provided by receiving downlink control information for a HARQ protocol using Type 1 codebook in which there is a single resource granted for transmitting HARQ feedback messages in the uplink control channel for a grant two downlink communications resources.

As shown in FIG. 6, five slots 302.1, 302.2, 302.3, 302.4, 302.5 are shown of the downlink time divided structure 303 of FIG. 6 with respect to five corresponding slots 312.1, 312.2, 312.3, 312.4, 312.5 of an uplink time divided structure 315. In correspondence with the explanation given above with respect to FIG. 5, the gNB transmits a DCI indicating a location in time and frequency of resources of the PDSCH where the gNB will transmit a transport block. As shown in FIG. 6 there are two DCIs 320, 322 identified as DCI #1 and DCI #2, which point to two PDSCHs 330, 332 identified as PDSCH #1, PDSCH #2 in time slots (slots) 302.2, 302.4 as represented by the arrows 340, 342. The PDSCH transmission of TBs are within a Mux Window 350 of four time slots 302.1, 302.2, 302.3, 302.4. Each of these DCIs 320, 322 also indicates communications resources in time and frequency where the UE 270 should transmit its HARQ feedback message in a PUCCH. As shown in FIG. 6, the HARQ feedback message is provided in the fifth slot 312.5 of the uplink 315, which is in PUCCH resources 360 indicated by each of the DCIs 320, 322 as presented by arrows 370, 372.

As shown in FIG. 6, a maximum $K_1$ value is four slots, which means that the Mux Window 318 is four slots and each slot contains a single PDSCH occasion or PDSCH transmission opportunity. At time $t_0$ in slot n, DCI #1 320 schedules PDSCH #1 330 in slot n+1 302.2 and the corresponding PUCCH 360 in slot n+4, i.e. $K_1$=3. At time $t_2$, slot n+1, another DCI 322, DCI #2, is transmitted to the UE which schedules PDSCH #2 332 in slot n+3 302.4 and the corresponding PUCCH 360 in slot n+4, i.e. $K_1$=1. Since PDSCH #1 and PDSCH #2 330, 332 share the same PUCCH slot 312.5, their HARQ feedback messages are multiplexed together so that they are transmitted using a single PUCCH 360. In this example, the Type 1 HARQ codebook size is four where each entry corresponds to a PDSCH occasion, which provide four HARQ feedback messages, for each of slots {n, n+1, n+2, n+3} 302.1, 302.2, 302.3, 302.4. Since the codebook size is fixed, the PDSCH occasions that do not contain any scheduled PDSCH, i.e. in slot n and slot n+3 would indicate a NACK whilst those PDSCH occasions that has a scheduled PDSCH, i.e. slot n+1 and slot n+3, would indicate either an ACK or NACK depending on the decoding outcome of the PDSCH. In this example, it is assumed that the UE 270 decodes PDSCH #1 and PDSCH #2 successfully and hence the HARQ codebook would indicate {0101} (where 0=NACK and 1=ACK) for slots {n, n+1, n+2, n+3} respectfully.

Although effective, a Type 1 HARQ codebook is considered to be not resource efficient since the UE needs to provide a HARQ feedback message regardless whether any PDSCH is scheduled in a PDSCH occasion or not.

Type 2 HARQ Codebook

In contrast to the Type 1 HARQ codebook, the size of Type 2 HARQ codebook is dynamically determined. This is because an entry (for a HARQ feedback) in the codebook is only created if a PDSCH is scheduled. However, if the UE missed a downlink grant, it would not be unaware of the corresponding scheduled PDSCH and would therefore feedback a wrong HARQ codebook size (i.e. wrong number of HARQ feedbacks). Recognising this problem, a Downlink Assignment Index (DAI) field is used in the downlink grant to keep track of the number of the scheduled PDSCH, such that the UE is aware if it misses any intermediate downlink grants. An example of Type 2 HARQ codebook is shown in FIG. 7, where corresponding reference numerals are used to those in FIG. 6 and only the differences will be described.

Figure 7:
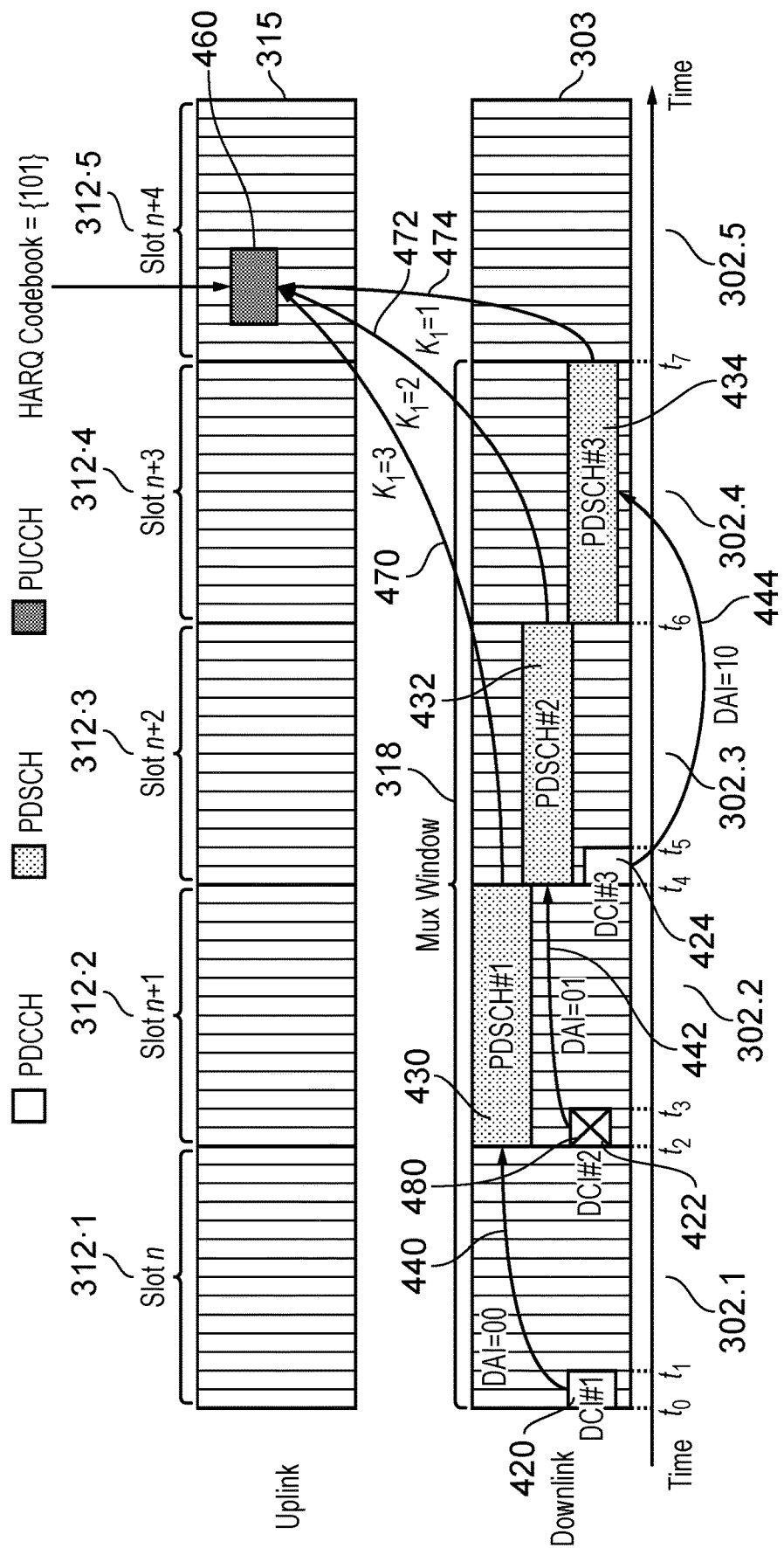
FIG. 7 is a schematic representation of five slots of an uplink and a downlink of the wireless access interface of FIG. 5 illustrating a grant of downlink communications resources on a shared channel and uplink communications resources on a control channel provided by receiving downlink control information for a HARQ protocol using Type 2 codebook in which there is a single resource granted for transmitting HARQ feedback messages in the uplink control channel for a grant three downlink communications resources.

As shown in FIG. 7, as with FIG. 6 the gNB transmits a DCI indicating a location in the time and frequency resources of the PDSCH where the gNB will transmit a transport block. However in FIG. 7 there are three DCIs 420, 422, 444 identified as DCI #1, DCI #2 and DCI #3, which point to three PDSCHs 430, 432, 432 identified as PDSCH #1, PDSCH #2 and PDSCH #3 in time slots 302.2, 302.3, 302.4 as represented by the arrows 440, 442, 444. The PDSCH transmission of transport blocks are within a Mux Window 350 of four time slots 302.1, 302.2, 302.3, 302.4. Also as explained above, each of the DCIs 420, 422, 424 also indicates communications resources in time and frequency where the UE 270 should transmit its HARQ feedback message in a PUCCH. As shown in FIG. 7, the HARQ feedback message is provided in the fifth slot 312.5 of the uplink 315, which is in PUCCH resources 460, which is indicated by each of the DCIs 420, 422, 424 as presented by arrows 470, 472, 474.

As for the example of FIG. 6, in FIG. 7 again the Mux Window 350 is four slots 302.1, 302.2, 302.3, 302.4. For the example of FIG. 7, a DAI field of two bits {00, 01, 10, 11} is provided in each of the respective DCIs 420, 422, 424. The DAI counter is circular, that is it revert back to 00 after four PDSCHs. In this example DCI #1, DCI #2 and DCI #3 schedules PDSCH #1 in slot n+1, PDSCH #2 in slot n+2 and PDSCH #3 in slot n+3 302.2, 302.3, 302.4 respectively, where all the HARQ feedback messages for these PDSCHs are multiplexed into a PUCCH 460 in slot n+4 312.5. The DAI is increased for each scheduled PDSCH, that is, DCI #1 indicates a DAI=00 since it scheduled PDSCH #1, DCI #2 indicates a DAI=01 for PDSCH #2 and DCI #3 indicates a DAI=10 for PDSCH #3. In this example, the UE missed DCI #2 as represented by X 480, i.e. it fails to detect the PDCCH carrying DCI #2 at time $t_2$, however, at time $t_4$, it receives DCI #3 which has a DAI=10. Since the last downlink grant was in DCI #1 which indicates a DAI=00, the UE 270 therefore is aware that it missed a downlink grant with a DAI=01. Assuming that the UE 270 successfully decoded PDSCH #1 and PDSCH #3, the UE 270 would multiplex three HARQ feedback messages in a codebook for the PUCCH 460 in slot n+4 312.5 where the HARQ codebook entries are {101}, i.e. an ACK for PDSCH #1, a NACK for the missed PDSCH #2 and another ACK for PDSCH #3.

PDSCH Occasions

A brief explanation will now be given of a structure of the DCIs shown in FIGS. 7 and 8 which has been proposed for New Radio (NR)/5G. This proposed format for a DCI uses a Time Domain Resource Assignment (TDRA) field to indicate time resources granted in the downlink for a PDSCH. The TDRA can be {0, 1, 2, 3, 4} bits and is an index to a lookup table where each entry in the lookup table contains the following information:

$K_0$: the number of slots relative to the slot containing the downlink grant (DCI) where the PDSCH is located S: the starting OFDM symbol of the PDSCH relative to the slot boundary (within the slot indicated in $K_0$)

L: the length of PDSCH in units of OFDM symbols

The OFDM symbols containing DMRS

The PDSCH mapping, either Type A or Type B

Figure 8:
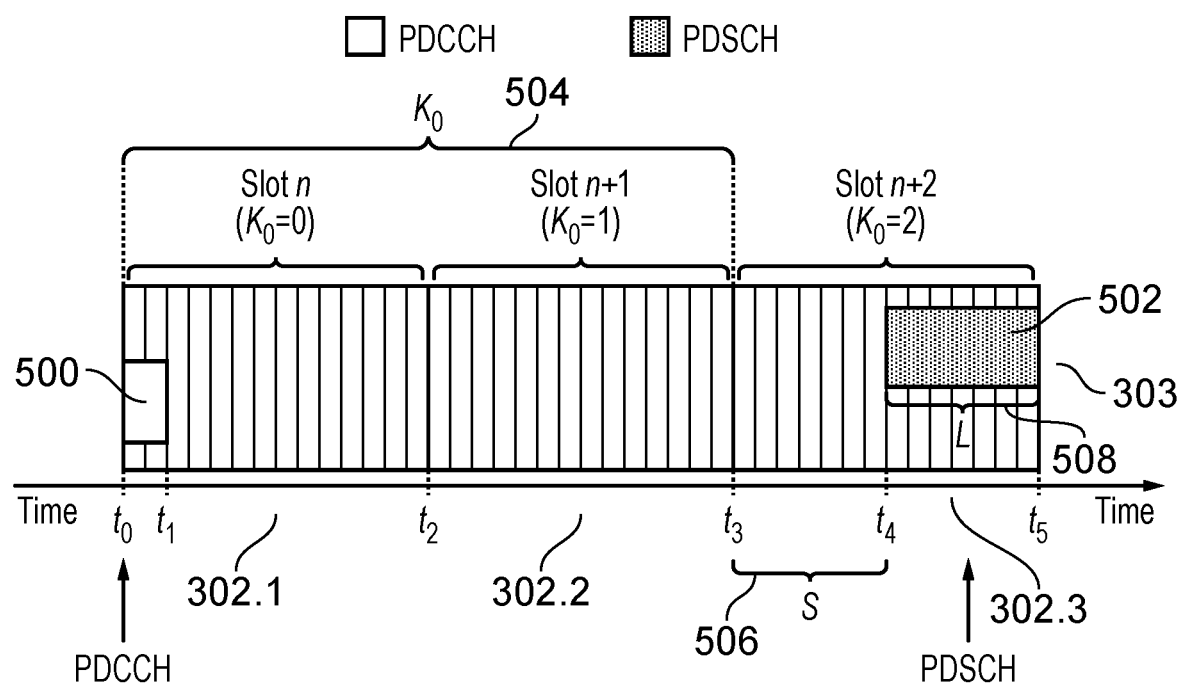
FIG. 8 is a schematic representation of three time slots of the downlink of the wireless access interface illustrating how parameters from a Time Domain Resource Assignment (TDRA) Table are used to locate a granted downlink communications resource in a shared channel (PDSCH)

An example describing the parameters $K_0$, S and L is provided in FIG. 8 for the downlink frame structure of FIGS. 7 and 8. In FIG. 8 a DCI 500 transmitted in a PDCCH in a first time slot n 302.1 indicates a downlink grant of a PDSCH 502 with TDRA parameters are $K_0$=2 504, which indicates slot n+2 302.3, S=7 OFDM symbols 506 and L=7 OFDM symbols 508.

Each entry in the TDRA table is a potential PDSCH candidate and a PDSCH occasion is a time period where a single PDSCH candidate can be received by the UE. There can be multiple overlapping PDSCH candidates in a single PDSCH occasion. The PDSCH occasion is determined sequentially by first taking the TDRA entry with the earliest ending symbol m, and then group all TDRA entries where S≤m, i.e. all PDSCH candidates that starts before m are grouped into a PDSCH occasion. This is explained using an example two bit (four entries) TDRA table as in Table 1 below, where Demodulation Reference Symbols (DMRS) locations and PDSCH Mapping Type fields have been omitted.

TABLE 1

Example TDRA table with 4 entries

| TDRA Index | $K_0$ | S | L |
|---|---|---|---|
| 0 | 1 | 0 | 14 |
| 1 | 1 | 0 | 7 |
| 2 | 1 | 7 | 7 |
| 3 | 2 | 3 | 11 |

Figure 9:
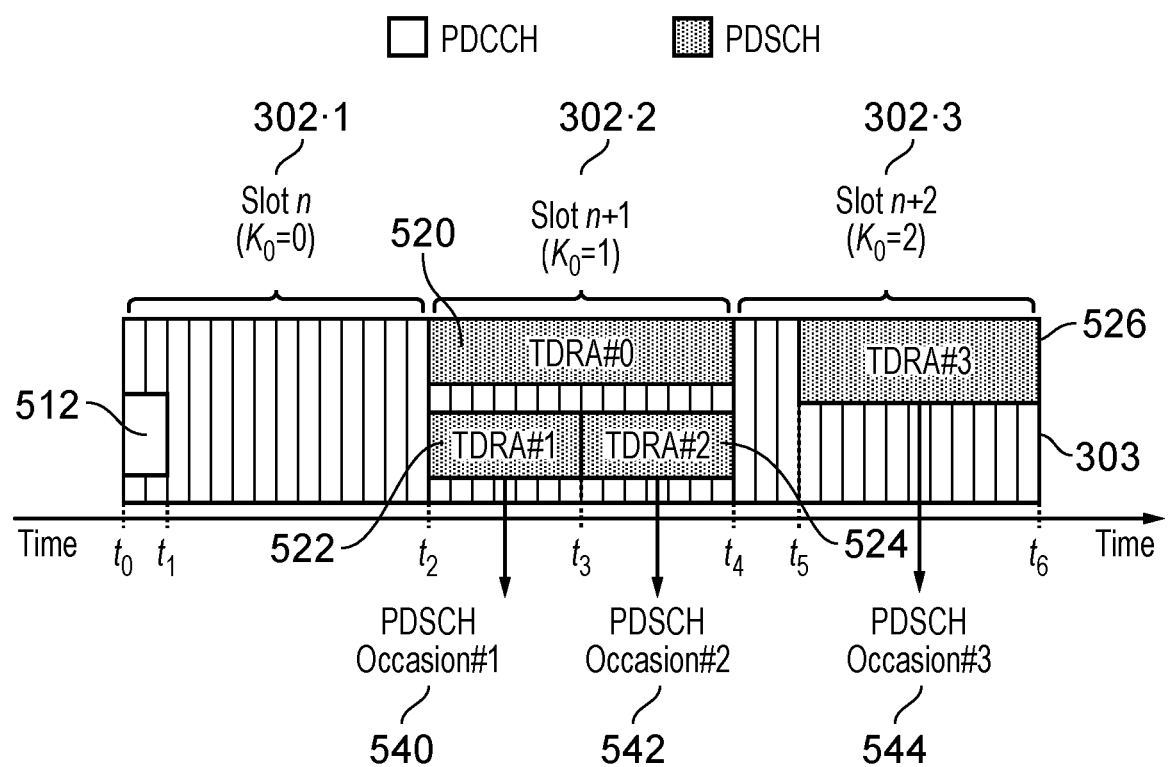
FIG. 9 is a schematic representation of three time slots of the downlink in which a downlink control information message grants four allocations of communications resources from the downlink shared channel which are grouped into three shared channel occasions.

FIG. 9 shows an example of four PDSCH candidates 520, 522, 524, 526 which are indicated by a DCI 512, with each being indicated with a corresponding TDRA entry in Table 1 above as TDRA #0, TDRA #1, TDRA #2, TDRA #3. These candidates 520, 522, 524, 526 are then used by the UE to determine its PDSCH occasions. These may be determined using the following steps:

1. The PDSCH candidate with the earliest ending symbol $m_1$ is TDRA #1, which ends in symbol 6 of slot n+1 302.2 (where n is the slot 302.1 containing the downlink grant)
2. The entries where the starting symbol S≤$m_1$ (symbol 6 of slot n+1 302.2) are {TDRA #0, TDRA #1} 520, 522
3. These entries 520, 522 are grouped by the UE {TDRA #0, TDRA #1} into PDSCH Occasion #1 540, and these PDSCH candidates 520, 522 are removed from the TDRA table
4. The next PDSCH candidate 524 with the earliest ending symbol $m_2$, belongs to TDRA #2, which ends in symbol 13 of slot n+1 302.2.
5. The PDSCH candidate with S≤$m_2$ (symbol 13 of slot n+1) is {TDRA #2} 524
6. The PDSCH candidate for TDRA #2 is grouped into PDSCH Occasion #2 542 and then removed from the TDRA table 7. The PDSCH candidate identified for TDRA #3 526 is the only PDSCH candidate left and going through the steps will result in TDRA #3 being grouped into a PDSCH Occasion #3 544

According to the above process performed by the UE and illustrated in FIG. 9, three PDSCH occasions 540, 542, 544 are identified as PDSCH Occasion #1={TDRA #0, TDRA #1}, PDSCH Occasion #2={TDRA #2} and PDSCH Occasion #3={TDRA #3}.

Current proposals for a Type 1 (semi-static) HARQ codebook only allow a single HARQ feedback to be transmitted per PDSCH occasion. As a result and using the example above with reference to FIG. 9, a Type 1 HARQ codebook can multiplex 3 PDSCH HARQ feedbacks, whereas there are in fact four PDSCH candidates.

Overlapping Intra-UE PDSCH

Figure 10:
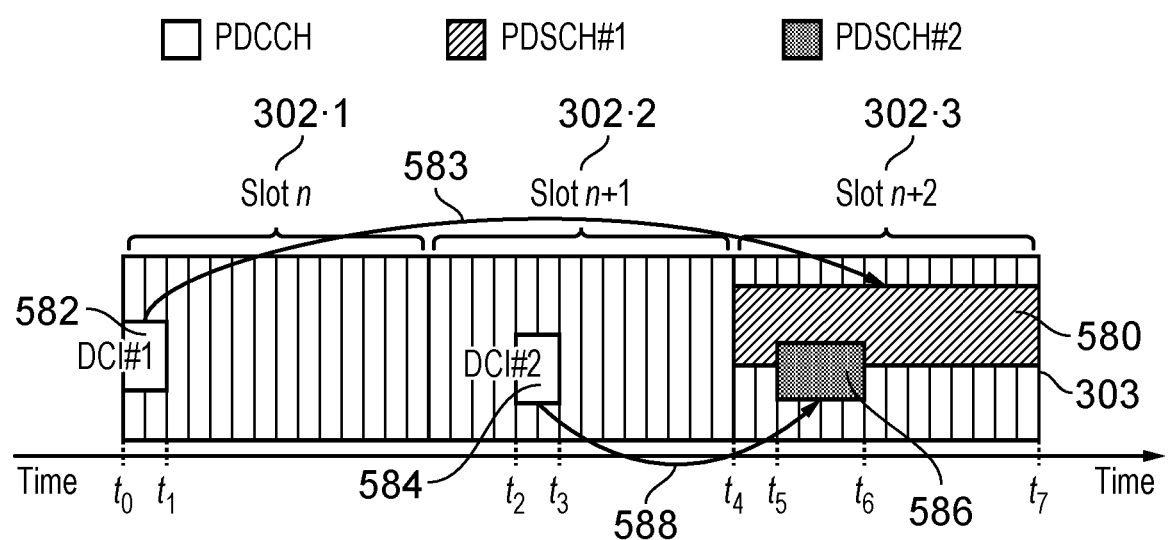
FIG. 10 is a schematic representation of three time slots of the downlink in which two downlink control information messages grant two allocations of communications resources from the downlink shared channel which overlap in time and also frequency.

As will be appreciated from the above explanation, because more than one DCI may be transmitted to a UE, there is a possibility for intra-UE PDSCH transmissions in which two dynamically scheduled PDSCHs for a UE overlap in time. An example is shown in FIG. 10. In FIG. 10, a downlink grant of PDSCH resources 580 by a first DCI #1 582 transmitted in a first time slot 302.1 to a UE at time $t_0$, schedules a transmission PDSCH #1 in slot n+2 302.3 (time $t_4$ to $t_7$) as represented by an arrow 583. At time $t_2$, another DCI #2 584 is transmitted in a second time slot 302.2 to the same UE, which schedules a transmission PDSCH #2 586 in the slot n+2 302.3 at time $t_5$ to $t_6$ as represented by an arrow 588. Here PDSCH #1 580 and PDSCH #2 586 overlap in time between $t_5$ to $t_6$ and also partially in frequency. Although in this example the two PDSCHs 580, 586 also overlap in frequency, there can be two cases where:

1. Two intra-UE PDSCH overlap in time but not in frequency
2. Two intra-UE PDSCH overlap in time and frequency A UE may not be capable of processing two PDSCH which overlap in time and in this case needs to drop one of them, for example by determining a relative priority between the PDSCHs and dropping the lower priority PDSCH. Although in this case, the gNB can be aware of which PDSCH the UE would drop, it desirable for the UE to provide HARQ feedback message to both PDSCHs (i.e. a NACK is sent for the dropped PDSCH) to that the wireless communications network is informed that the UE has not received a PDSCH transmission even if this is because the UE elected not to try to receive this transmission. That is to say that providing an obvious NACK for the dropped PDSCH to the gNB implicitly provides to the network an ACK for the PDCCH carrying the downlink grant for the dropped PDSCH in the DCI.

Currently proposed wireless communications systems do not expect that two PDSCHs will overlap in the same carrier or bandwidth part when scheduled by two independent downlink grants (DCI). As explained above, the HARQ codebooks of Type 1 and Type 2, but especially Type 1 have not been designed to provide for such HARQ feedback messages for overlapping PDSCHs because only a single HARQ feedback message is provided per PDSCH occasion. Hence, new methods are required to provide HARQ feedback messages for two overlapping PDSCH in the same UE.

Embodiments of the present technique can provide a communications device configured to transmit HARQ feedbacks to downlink data received from different downlink resources of a shared channel which overlap in time. The downlink data is communicated using an automatic repeat request technique such as a Hybrid ARQ technique. The communications device receives one or more downlink control messages indicating the different downlink communications resources for receiving the downlink data with an indication of resources of one or more uplink control channel for transmitting HARQ feedback messages indicating whether the downlink data was received (and decoded successfully) respectively from each granted resource of a downlink shared channel. The communications device detects that two of the downlink resources overlap in time, and applies one or more criteria or rules to determine whether the communications device can transmit HARQ feedbacks for the downlink data from the overlapping downlink communications resources. The one or more criteria (if not met) may determine that the communications device cannot transmit a HARQ feedback message for both of the two granted downlink communications resources which overlap, based for example on a location in time of the corresponding uplink resources for transmitting the respective HARQ feedback messages, a type of codebook used to form the HARQ feedback messages or whether the overlapping downlink resources are allocated to the same shared channel receiving occasion. Furthermore the communications device can in some examples provide a HARQ feedback message for the transport block transmitted on the downlink communications resources, even if the corresponding uplink control channels overlap in time, by adapting the HARQ feedback message which is transmitted. The wireless communications network can also determine that the communications device will transmit HARQ feedback for one of the selected transport blocks and take appropriate action including providing uplink resources for the HARQ feedback of the unacknowledged transport block in another uplink control channel occasion.

According to example embodiments a UE can be configured to apply criteria or restrictions to determine whether a HARQ feedback message can be provided for overlapping intra-UE PDSCHs. In some embodiments, if the criteria or restrictions are not met, the UE will only provide HARQ feedback message for a determined higher priority PDSCH and drop the feedback for a determined lower priority PDSCH.

In some example embodiments, if the criteria or restrictions are not met, the UE will provide a HARQ feedback message for the higher priority PDSCH using the PUCCH as indicated by the downlink grant indicated for example by following a $K_1$ indication in a PDSCH-to-HARQ_feedback field in the DCI. According to this example, the feedback for the lower priority PDSCH is delayed to a next PUCCH occasion.

Example Embodiment for Multiple PUCCHs Criteria

According to a first example embodiment, HARQ feedback messages are provided to both overlapping PDSCHs for the UE if each PDSCH is associated with a different HARQ codebook construction or associated with different PUCCH. This example embodiment is beneficial especially in Type 1 codebook where only a single HARQ feedback message is provided per PDSCH occasion and if the overlapping PDSCHs belong to different PUCCHs as indicated by different DCIs or the feedback is indicated according to a different HARQ codebook, then effectively these overlapping PDSCHs belong to different PDSCH occasions. That is, according to this example a rule is applied by the UE to determine that each of the PDSCH candidates directed by each DCI are determined to belong to different PDSCH occasions. As a result the UE can provide HARQ feedback messages for both overlapping PDSCHs but in different PUCCH transmissions.

Figure 11:
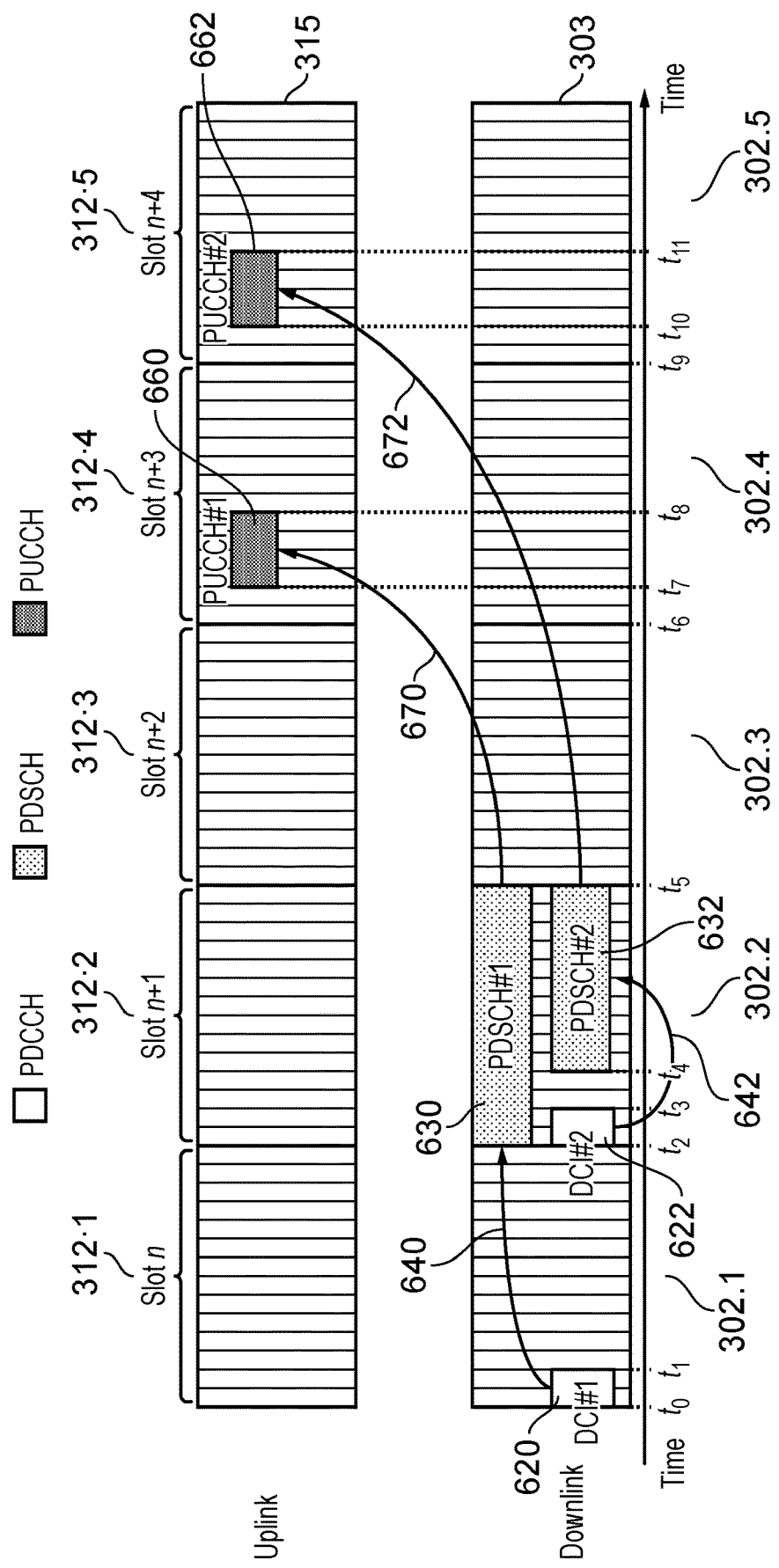
FIG. 11 is a schematic representation of five slots of an uplink and a downlink of the wireless access interface of FIG. 5 illustrating a grant of downlink communications resources on a shared channel and uplink communications resources on a control channel provided by receiving two downlink control information messages for a HARQ protocol using Type 1 codebook in which granted allocations of the downlink resources of the shared channel (PDSCH) overlap in Time, whereas the allocation of the uplink control channel resources (PUCCH) for transmitting HARQ feedback messages are in separate time slots.

As shown in FIG. 11, as with the examples of FIGS. 6 and 8, the gNB transmits a first DCI #1 620 in the PDCCH of a first slot 302.1, which indicates a location in the time and frequency resources of the PDSCH #1 630 where the gNB will transmit a transport block (PDSCH candidate) in a second slot n+2 302.2 as represented by an arrow 640. A second DCI #2 622 is transmitted by the gNB in the PDCCH of the second slot n+2 302.2, which indicates a location in the time and frequency resources of the PDSCH #2 632 where the gNB will transmit a transport block (PDSCH candidate) as represented by an arrow 642 in the second slot n+2 302.2. Furthermore, each of the DCIs DCI #1 620, DCI #2s 622, also indicates communications resources in time and frequency of the uplink 315 where the UE 270 should transmit its HARQ feedback message in a PUCCH. As shown in FIG. 11, the HARQ feedback message for PDSCH #1 630 is indicated to be in the PUCCH #1 660 of the fourth slot n+3 312.4 as represented by an arrow 670 and the HARQ feedback message for PDSCH #2 632 is indicated to be in the PUCCH #2 662 of the fifth slot n+3 312.5 as represented by an arrow 672. As will be appreciated therefore, DCI #1 620 and DCI #2 622 schedules PDSCH #1 630 and PDSCH #2 632 respectively such that they overlap in time but not overlap in frequency. In this example embodiment, the UE performs a process to analyse whether it can provide a HARQ feedbacks for both overlapping PDSCHs. The UE determines whether it can provide HARQ feedbacks for both overlapping PDSCHs by determining whether the corresponding HARQ feedback message can be transmitted on a different PUCCH, e.g. PUCCH #1 660 and PUCCH #2 662 which in FIG. 11 are in different time slots n+3 312.4 and slot n+4 312.5. Since different PUCCHs are used, the UE can therefore provide HARQ feedback message for these overlapping PDSCHs 630, 632. According to this example embodiments of the present technique can be configured to apply a restriction which determines whether the PUCCHs granted for HARQ feedbacks are the same and if the HARQ feedbacks share the same PUCCH, select a HARQ feedback corresponding to one or other of the PDSCHs to transmit.

According to the example embodiments, it does not matter whether the UE receives the downlink data from both of the PDSCH #1 and PDSCH #2 or only one of them. The predetermine criteria determine whether the UE can provide HARQ feedback for these overlapping PDSCHs that. If the UE cannot provide HARQ feedback for both PDSCH #1 and PDSCH #2 then it drop one of the HARQ feedback, but this may not be effected by whether or not it receives both of the PDSCH #1 and PDSCH #1 or not. This is because the UE may receive the downlink data from both PDSCH #1 and PDSCH #2 but still have to drop one of the HARQ feedbacks because the criteria such as the PUCCH resource/condition does not allow it to transmit both.

Example embodiments therefore include one or more predetermined criteria which can be used to apply a restriction on a minimum temporal proximity of the first uplink communications resource for transmitting the first HARQ feedback message with respect to the second uplink communications resource for transmitting the second HARQ feedback message. The applying the one or more predetermined criteria to determine that the UE can transmit HARQ feedbacks for both the first downlink data and the second downlink data includes determining that a temporal location of the first uplink communications resource and a temporal location of the second uplink communications resource are less than or equal the minimum temporal proximity restriction, and selecting to transmit HARQ feedback for one of the first downlink data or the second downlink data. The minimum temporal proximity restriction can be a slot or sub-slot. The restriction can be HARQ codebook type dependent (Type 1 or Type 2) and can include a restriction that the uplink resources granted for two HARQ feedback messages cannot be in the same slot, or cannot overlap in time as explained in the example below.

According to currently proposed wireless communications systems, there can only be one PUCCH carrying HARQ feedback message per slot 312. However, it has been proposed to include more than one PUCCH carrying HARQ feedback messages per slot 312 to enable faster HARQ feedback message for URLLC transmissions. According to this proposal the $K_1$ granularity is in units of sub-slots rather than slots, which is less than a slot (e.g. 4 or 7 OFDM symbols). As explained above, $K_1$ is a number of slots after the PDSCH transmission where the uplink resources of the PUCCH are provided for transmitting the ACK/NACK. By arranging for the $K_1$ value to be in units of sub-slots rather than slots, the HARQ feedback for an eMBB PDSCH can be arranged to use a first HARQ codebook such as a legacy codebook where $K_1$ is in units of slots and the HARQ feedback for a URLLC PDSCH can be arranged to use a second HARQ codebook where $K_1$ is in units of sub-slots. As such, and according to the example of FIG. 11 a UE can be configured according to this example where a PUCCH transmission occurs in the same slot, i.e. the said minimum temporal proximity restriction is a slot. An example is shown in FIG. 12, which is an example based on FIG. 11 and so only the differences will be described.

Figure 12:
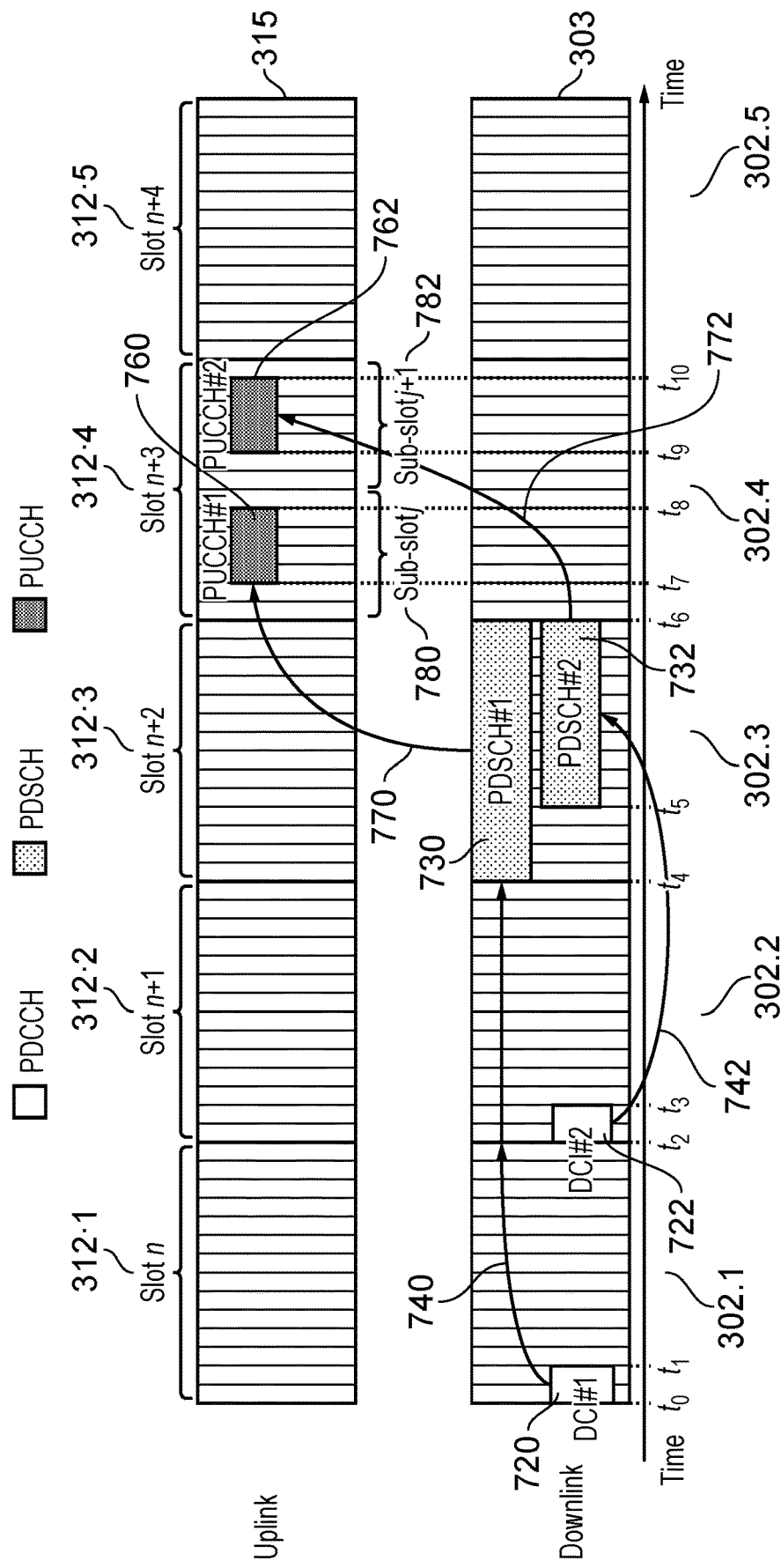
FIG. 12 is a schematic representation of five slots of an uplink and a downlink of the wireless access interface of FIG. 5 illustrating a grant of downlink communications resources on a shared channel and uplink communications resources on a control channel provided by receiving two downlink control information messages for a HARQ protocol using Type 1 codebook in which granted allocations of the downlink resources of the shared channel (PDSCH) overlap in Time, whereas the allocation of the uplink control channel resources (PUCCH) for transmitting HARQ feedback messages are in the same time slot but in different sub-slots.

As shown in FIG. 12 the gNB transmits a first DCI #1 720 in the PDCCH of a first slot 302.1, which indicates a location in the time and frequency resources of the PDSCH #1 730 of a PDSCH candidate in a third slot n+2 302.3 as represented by an arrow 740. A second DCI #2 722 is transmitted by the gNB in the PDCCH of the second slot n+2 302.2, which indicates a location in the time and frequency resources of the PDSCH #2 732 of a PDSCH candidate as represented by an arrow 742 in the third slot n+2 302.3. As for the example of FIG. 11, each of the DCIs DCI #1 720, DCI #2s 722, also indicates communications resources in time and frequency of the PUCCH of the uplink 315 where the UE 270 should transmit its HARQ feedback message. For the example embodiment of FIG. 12, the HARQ feedback message for PDSCH #1 730 is indicated to be in the PUCCH #1 760 of the fourth slot n+3 312.4 as represented by an arrow 770 and the HARQ feedback message for PDSCH #2 732 is indicated to be in the PUCCH #2 762 as represented by an arrow 772, which is in the same slot n+3 312.4 as the PUCCH #1 760.

For the example of FIG. 12, overlapping PDSCHs PDSCH #1 730, PDSCH #2 732 are associated with HARQ feedback message messages transmitted in the PUCCH of slot n+3 312.4 PUCCH #1 760, PUCCH #2 762 respectively. However in contrast to the example shown in FIG. 11, the PUCCH #1 760 and PUCCH #2 762 are in the same slot n+3 312.4 but in different sub-slots 780, 782. According to this example, the PDSCH transmissions may be carrying downlink data for different services and therefore have a differently configured HARQ feedback message. For example, PDSCH #1 can be an eMBB transmission using a legacy HARQ codebook whilst PDSCH #2 can be a URLLC transmission using the sub-slot based HARQ codebook. According to this example therefore the UE is configured to determine whether to transmit HARQ feedbacks for the downlink data transmitted via the respective PDSCH transmissions PDSCH #1, PDSCH #2 by identifying that it can transmit the HARQ feedback (ACK/NACK) in separate PUCCHs, even though they are allocated to the same slot because the HARQ codebook for one of those PUCCH transmissions is for a service which allows transmission on a sub-slot basis which does not overlap in time. That is to say the said minimum temporal proximity restriction is a sub-slot According to this example embodiment therefore the UE is configured to detect whether the HARQ feedback messages are to be transmitted in different sub-slots and different codebooks and if not, select a HARQ feedback for one of the PDSCHs to transmit.

Figure 13:
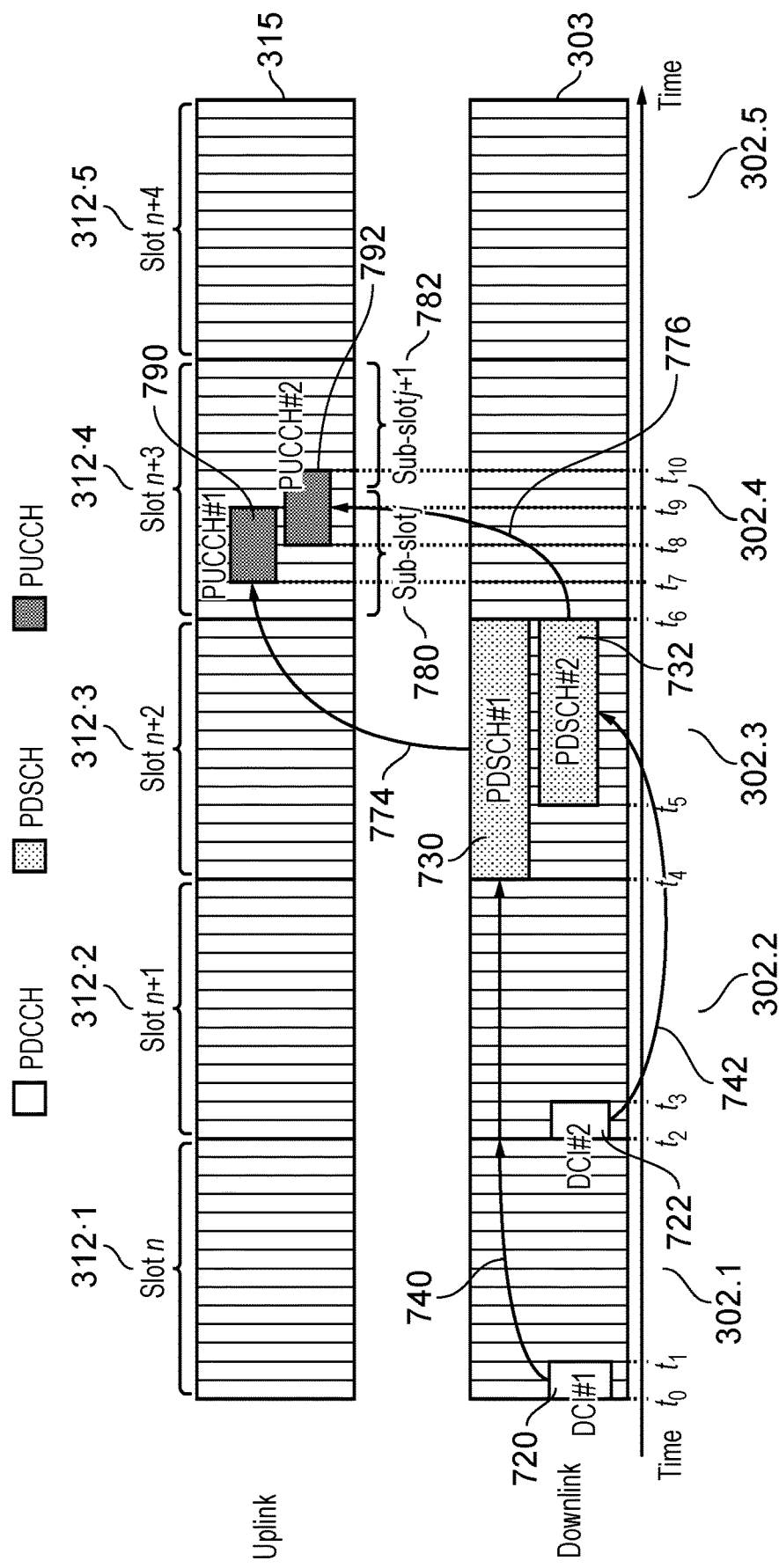
FIG. 13 is a schematic representation of five slots of an uplink and a downlink of the wireless access interface of FIG. 5 illustrating a grant of downlink communications resources on a shared channel and uplink communications resources on a control channel provided by receiving two downlink control information messages for a HARQ protocol using Type 1 codebook in which granted allocations of the downlink resources of the shared channel (PDSCH) overlap in Time, and the allocation of the uplink control channel resources (PUCCH) for transmitting HARQ feedback messages are in the same time slot and overlap in time.

In another example in which multiple PUCCHs carrying HARQ feedback messages are allocated for the same slot (or sub-slot), the criteria/requirement for the UE to transmit HARQ feedback for the downlink data from the corresponding PDSCH requires that the PUCCHs associated with the overlapping PDSCHs, do not overlap in time. An example is shown in FIG. 13, which corresponds to the same example of FIG. 12 except that the first DCI DCI #1 720 indicates with an arrow 774 a first PUCCH #1 790 in the first sub-slot 780, which overlap in time with resources for the UE to transmit a second HARQ feedback message between the first and the second sub-slots 780, 782 of a second PUCCH #2 792 as represented by an arrow 776. According to this example embodiment, the UE determines that it cannot transmit the HARQ feedback message (ACK/NACK) for both the overlapping PDSCHs PDSCH #1, PDSCH #2 because an associated PUCCH transmission indicated by the DCIs overlap in time. Therefore an example condition which triggers a procedure to select a HARQ feedback for one of the PDSCH candidates to transmit is if the associated PUCCH transmission for the HARQ feedback message overlaps in time.

According to this example, for a plurality of PUCCHs carrying HARQ feedback messages in the same slot or sub-slot, the UE determines whether the PUCCHs are associated with the overlapping PDSCHs overlap in time. As illustrated by the example of FIG. 13, the PUCCHs PUCCH #1 790, PUCCH #2 792 overlap in time. For this example, the UE determines a relative priority between receiving the downlink data from the respective PDSCHs and will either drop a lower priority PUCCH or multiplex the HARQ feedbacks from PUCCH #1 and PUCCH #2 into a single PUCCH using multiplexing rules for example those defined in our co-pending European patent application 19166662.7 [9], the content of which are incorporated herein by reference.

According to another example embodiment, a UE may detect that resources of a PUCCH have been allocated for transmitting a HARQ feedback message for two different PDSCHs which overlap in time and therefore collide. The UE then determines that it can transmit the HARQ feedback message for the different PDSCHs even though the corresponding PUCCH overlap in time by multiplexing the HARQ feedback messages into the same PUCCH. The HARQ feedback messages are therefore multiplexed into one of the PUCCH resources.

For an example in which the UE determines that it must compromise on the number of HARQ feedbacks which it transmit, the UE identifies a relative priority between receiving the downlink data from different PDSCHs. The UE then drops transmission of a PUCCH associated with a lower priority PDSCH and allocates any capacity of the remaining PUCCH after this capacity has been allocated to transmit the HARQ feedback messages for the higher priority PDSCH to the lower priority PDSCH. That is to say that a capacity available in the PUCCH is firstly given to the HARQ feedbacks corresponding to the higher priority downlink data and the HARQ feedbacks corresponding to the lower priority PDSCH is then multiplexed to the PUCCH. For example, if PUCCH #1 contains HARQ feedback messages for four eMBB PDSCHs and PUCCH #2 contains HARQ feedback messages for three URLLC PDSCHs, as provided in our co-pending European patent application 19166662.7 [9], some of the bits in PUCCH #1 are multiplexed into the PUCCH #2 and the PUCCH #1 transmission is dropped, assuming that the PUCCH associated with the eMBB PDSCHs has a lower priority. If there is insufficient capacity in the PUCCH #2 to carry all the HARQ feedback messages (seven HARQ feedback messages in total for all of the eMBB PDSCHs and URLLC PDSCHs), then some of the HARQ feedback messages belonging to PUCCH #1 are dropped. According to this embodiment the gNB will know that a HARQ feedback message corresponding to a lower priority eMBB PDSCH that overlaps a URLLC PDSCH will be dropped. Since the gNB knew the UE would drop the lower priority overlapping PDSCH, it is beneficial to transmit the HARQ feedbacks for the other PDSCHs where the gNB does not know the decoding outcome. This example corresponds to a case where the lower priority overlapping PDSCH is always dropped. However, this may not always be the case since there are some scenarios where the UE can process both overlapping PDSCHs especially when they do not overlap in frequency.

According to another example embodiment, the UE is configured to detect that the it will drop one of the PDSCHs according to the predetermined criteria and to signal implicitly to the gNB that it has dropped this PDSCH using the HARQ feedback message transmitted in the PUCCH for the PDSCH which it has selected to be received. Thus where the PUCCHs associated with the overlapping PDSCHs, also overlap in time, the UE can be configured to transmit the PUCCH associated with the higher priority PDSCH and use a different scrambling on that PUCCH to that which is expected by the gNB. The reason for signaling to the gNB that the UE has dropped the PDSCH is to provide the gNB with an indication that it has received the downlink grant for the associated PDSCH (DCI). For the case where the lower priority PDSCH is always dropped the rationale for transmitting a HARQ feedback message for a dropped PDSCH is to acknowledge implicitly the reception of the downlink grant associated with the dropped PDSCH. Hence, the use of a different scrambling code used on transmitting the HARQ feedback message via the PUCCH provides this implicit acknowledgement. Referring to the example in FIG. 13, the PDSCH #1 is determined to have a lower priority PDSCH (e.g. eMBB) than PDSCH #2 which has a higher priority PDSCH (e.g. URLLC). Here the associated PUCCHs overlap in time and in this embodiment, the UE drops PUCCH #1 but uses a different scrambling on PUCCH #2 to indicate a successful reception of DCI #1.

In another embodiment where the PUCCHs associated with the overlapping PDSCHs, also overlap in time, the UE transmits the PUCCH associated with the higher priority PDSCH. The PUCCH associated with the lower priority PDSCH can be delayed to another PUCCH occasion. A delay procedure according to one of the examples disclosed in our co-pending European patent application 19166662.7 [9] can be used.

Example Embodiment for Single PUCCH Criteria

Example embodiments described above provide an arrangement in which a UE is configured to manage transmission of HARQ feedbacks for downlink data in which HARQ feedback messages are required to be transmitted for overlapping PDSCHs, which the UE determines it can do if the HARQ feedback messages for these PDSCHs can be transmitted in different PUCCHs associated with the PDSCHs. The following embodiments consider example criteria/requirements for scenarios in which the overlapping PDSCHs share the same PUCCH or HARQ feedback message according to the same codebook.

Figure 14:
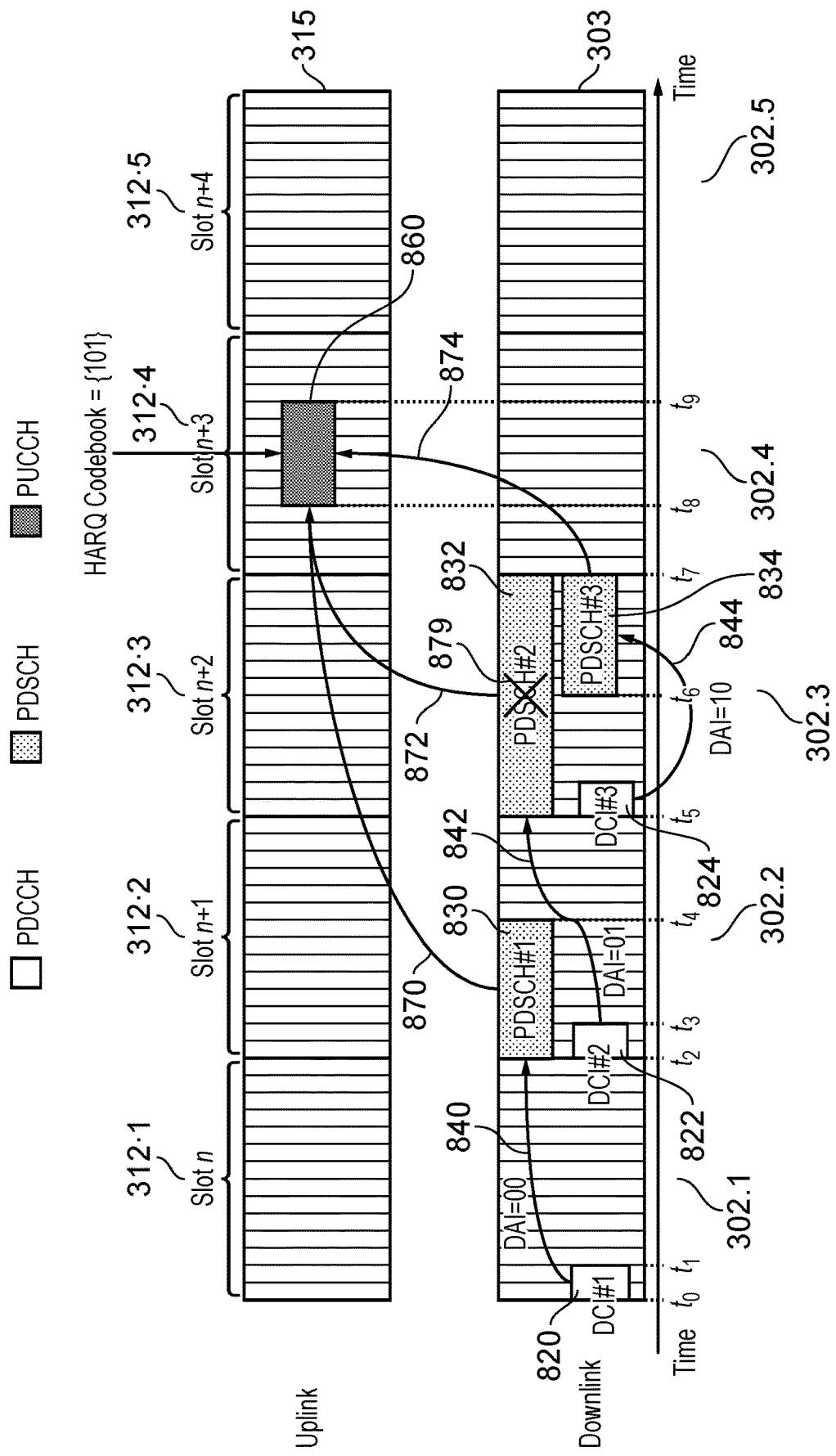
FIG. 14 is a schematic representation of five slots of an uplink and a downlink of the wireless access interface of FIG. 5 illustrating a grant of downlink communications resources on a shared channel and uplink communications resources on a control channel provided by receiving three downlink control information messages for a HARQ protocol using Type 2 codebook, which allocate three instances of downlink communications resources of the shared channel (PDSCH) two of which overlap in time and a single allocation of the uplink control channel resource (PUCCH) is provided for transmitting three HARQ feedback messages for the three grants of the downlink communications resources.

According to an example embodiment, HARQ feedback messages are provided for overlapping PDSCHs if these messages can be transmitted using Type 2 (dynamic) HARQ codebook. As explained above, the Type 2 HARQ codebook makes use of the DAI field to ensure that the correct number of HARQ feedback bits are transmitted in the associated PUCCH. Hence, the DAI counter can take account of any PDSCHs, which the UE may selects to drop (not receive the downlink data from the PDSCH) in the overlapping PDSCHs. An example embodiment is shown in FIG. 14, which again corresponds to the examples presented above. As shown in FIG. 14, in the PDCCH of slots n, n+1, n+2, 302.1, 302.2, 302.3 the UE receives from the gNB DCI #1 820, DCI #2 822 and DCI #3 824 respectively. These DCIs respectively schedule PDSCH #1 830, PDSCH #2 832 and PDSCH #3 830 as represented by arrows 840, 842, 844 and a PUCCH 860 for the UE to transmit a HARQ feedback message for these PDSCHs as represented by arrows 870, 872, 874. However the PDSCH #2 832 and the PDSCH #3 834 overlap in time. For this example, the data carried by PDSCH #2 832 is determined by the UE to have a lower relative priority and because the PDSCH #2 and PDSCH #3 overlap in time, the UE determines e.g. according to the UE's capability that it should drop PDSCH #2 in the sense that it does not receive downlink data transmitted in PDSCH #2 832 as represented by a X 879. Since a Type 2 codebook is used, the DAI counter is incremented for each of the PDSCHs 830, 832, 834 and hence the UE can provide a HARQ feedback message for both the PDSCH #2 832 and PDSCH #3 834 which overlap in time, even though it did not receive the downlink data from the PDSCH #2 832. Assuming that the UE successfully decodes PDSCH #1 830 and PDSCH #3 834, the UE transmits a combined HARQ feedback message in the allocated PUCCH resources 860 with a HARQ feedback message={101} for {PDSCH #1, PDSCH #2, PDSCH #3}.

According to another example embodiment, HARQ feedback messages for the overlapping PDSCHs can be provided using a Type 1 codebook if the overlapping PDSCHs belong to different PDSCH occasions. Otherwise the conditions or criteria/requirement which allow the UE to transmit HARQ feedback for downlink data from PDSCHs which overlap in time are considered not to have been met. Using the TDRA table example in FIG. 8 above, HARQ feedback messages are provided for two PDSCHs that overlap if these PDSCHs correspond to TDRA #0 and TDRA #2. However, if TDRA #0 and TDRA #1 are scheduled by different downlink grant indications (DCI), then the UE can provide only a HARQ feedback message for a determined relatively higher priority PDSCH and so must select a HARQ feedback for one of these PDSCHs.

In another example embodiment, for the case where the overlapping PDSCHs belong to the same PDSCH occasion of a Type 1 codebook, the UE can provide the HARQ feedback for a higher priority PDSCH and use a different scrambling for an associated PUCCH. An example is shown in FIG. 14, which uses the same TDRA table in Table 1 and corresponds to the example embodiment in FIG. 9 and so only the differences with respect to FIG. 9 will be described. As shown in FIG. 14, two DCIs DCI #1 920, DCI #2 922 are received in a first time slot n 302.1. These DCIs DCI #1 920, DCI #2 922 schedule an allocation of downlink resources on PDSCHs 520, 522 as represented by arrows 940, 942 that correspond to TDRA #0 and TDRA #1, causing these scheduled PDSCHs 520, 522 to overlap in time. For this example, it is assumed that the PDSCH scheduled by the later grant DCI #2 922 has higher priority. The UE therefore determines that it should drop the PDSCH #1 520 corresponding to TDRA #0, in that it should not attempt to receive the downlink data transmitted in the PDSCH #1 520. According to this example, the UE can provide a HARQ feedback message for TDRA #1 for the PDSCH occasion but the UE uses a different scrambling code for transmitting the HARQ feedback message to indicate that the downlink data transmitted PDSCH #1, was not received (NACK). The UE therefore does not select which PDSCH to drop, but determines which of the HARQ feedbacks it can transmit. According to this example the UE can drop a PDSCH but still transmit an indication of the HARQ feedback, because the restriction is one transmitting conflicting HARQ feedbacks, which may require either one of the HARQ feedbacks to drop or an adaptation of another transmission such as the HARQ feedback which can be transmitted to convey an indication of the HARQ feedback for a PDSCH whish is dropped.

As will be appreciated from the example embodiment described above with reference to FIG. 14, in other examples more than one PDSCH occasion can contain overlapping PDSCHs. For this example, a different PUCCH scrambling code can be used for each different number of PDSCH occasion with overlapping PDSCHs. For example if there are three PDSCH occasions in a Type 1 codebook there can be:

Eight different scrambling codes for the PUCCH to indicate which PDSCH occasion has overlapping PDSCH Three different scrambling codes can be used to indicate the number of PDSCH occasions with overlapping PDSCH In another embodiment, if the overlapping PDSCHs belong to the same PDSCH occasion (of Type 1 HARQ feedback codebook), the UE can provide a HARQ feedback message for the higher priority PDSCH and delay the HARQ feedback for the lower priority PDSCH, for example to another PUCCH occasion or in the next sub-slot or slot.

Other Example Embodiments

In another embodiment HARQ feedback messages for overlapping PDSCHs can be activated by RRC signaling, otherwise the UE can provide a HARQ feedback message only for the higher priority PDSCH. In another embodiment HARQ feedback messages for the overlapping PDSCHs can be activated by MAC signaling. Otherwise the UE can provide a HARQ feedback message only for the higher priority PDSCH. In another embodiment HARQ feedback messages for the overlapping PDSCHs can be activated by a Group Common DCI. Otherwise the UE can provide HARQ feedback only for the higher priority PDSCH. In another example embodiment HARQ feedback messages for the overlapping PDSCHs can be indicated in a DCI providing the downlink grant. Otherwise the UE can provide HARQ feedback only for a higher priority PDSCH. In another embodiment a higher priority PDSCH can be the PDSCH scheduled by the later grant. For example in FIG. 10, the PDSCH #2 is considered to have a higher priority than PDSCH #1 because PDSCH #2 is scheduled by DCI #2 which is transmitted after DCI #1 (which schedules PDSCH #1).

In another embodiment, whether a lower priority PDSCH is dropped or not can depend on a UE's capability to receive and to decode overlapping PDSCHs. If a UE can support this capability, the UE decodes both PDSCHs otherwise the UE will always drop a lower priority PDSCH.

In another embodiment example, whether a lower priority PDSCH is dropped or not depends on a UE's capability regarding a PDSCH processing time. According to currently proposed systems, the PDSCH processing time $N_1$, has been specified depending on PDSCH processing capability. For example, in the case of 15 kHz subcarrier spacing, a processing time for one PDSCH is three OFDM symbols for PDSCH processing capability two (suitable for URLLC). In this example embodiment, when a time gap $T_{PDSCH}$, between the overlapped PDSCH and PUCCH is over a specific length (e.g. 6 or more OFDM symbols), the lower priority PDSCH is not dropped, otherwise it is dropped. For example referring to FIG. 14, this time gap $T_{PDSCH}$ is between time $t_7$ and $t_8$ where the overlapping PDSCHs are PDSCH #2 and PDSCH #3. Assuming the PDSCH processing time is $N_1=3$ symbols then the UE can only process both PDSCHs if $T_{PDSCH} \geq M \times N1$. Here M can be equal to the number of overlapped PDSCHs, e.g. in this example M=2. Alternatively, M can be a UE capability, which is pre-specified and known deterministically so that the PDSCH processing time for the overlapped PDSCH can be newly specified.

It should be appreciated that the predetermined criteria described in above example embodiments are applicable whether the overlapping PDSCHs are both decoded or one of the PDSCHs is dropped. That is, if the predetermined criteria is met, the UE can provide feedbacks for BOTH overlapping PDSCHs even if the UE dropped the lower priority PDSCH (a NACK is sent for the dropped PDSCH). On the other hand, if the predetermined criteria is NOT met, the UE will provide HARQ feedback for ONE of the overlapping PDSCHs even though the UE can decode BOTH PDSCHs. The latter case may be cause by poor scheduling implementation and here the UE can decide not to decode both PDSCH.

Summary of Operation

Figure 16:
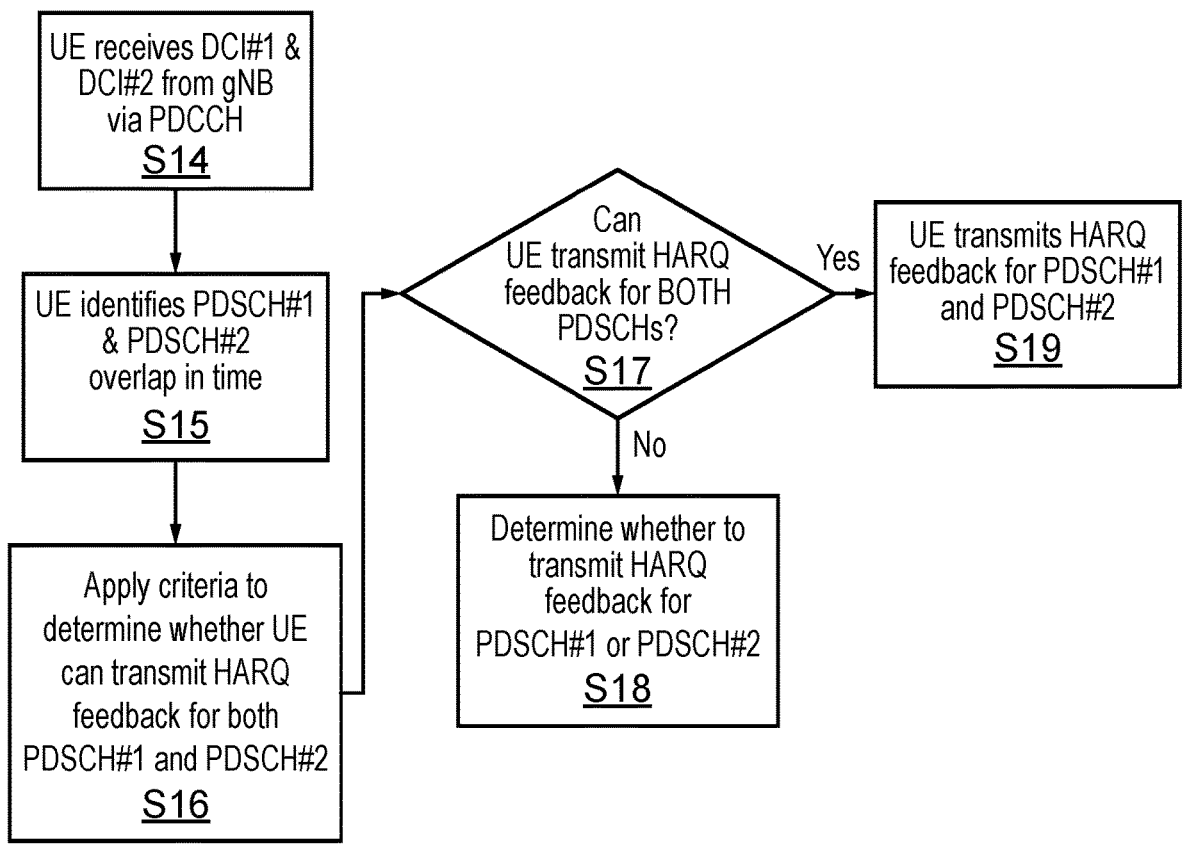
FIG. 16 is a flow diagram providing an example operation of a communications device (UE) according to an example embodiment.

FIG. 16 provides an example operation of a communications device (UE) which summarises the example embodiments explained above. According to this example, the UE operates as shown in FIG. 16, which is summarised as follows:

In a first step S14, the UE receives DCI #1 and DCI #2 and from the DCI #1 and DCI #2 identifies respectively a location of the PDSCH #1 in which the first downlink data is to be transmitted and a location of the PDSCH #2 in which the second downlink data is to be transmitted by the gNB. The UE also identifies in this step S14 the uplink communications resources of the corresponding PUCCH #1 and PUCCH #2 where the UE should transmit its HARQ feedback message (ACK/NACK) in response to the first and second downlink data. However in step S15, the UE identifies whether the communications resources of the PDSCH #1 and PDSCH #2 overlap in time. If the PDSCH #1 and PDSCH #2 overlap in time then in step S16 the UE applies one or more pre-configured or predetermined criteria to determine whether or not it can transmit HARQ feedback for both of the first and second downlink data transmitted in the PDSCH #1 and PDSCH #2. At decision point S17, the UE decides according to the analysis of the pre-configured criteria in step S16 whether it can transmit HARQ feedback for both the PDSCH #1 and PDSCH #2. If it can then processing proceeds to step S19. If the UE cannot transmit HARQ feedback for both of PDSCH #1 and PDSCH #2 then in process step S18, the UE determines whether to transmit a HARQ feedback for the first downlink data received in the PDSCH #1 or the second downlink data in the PDSCH #2.

A further more detailed example is provided by the flow diagram of FIG. 17. FIG. 17 is summarised as follows:

As explained above with reference to FIG. 5, and as with step S14 of FIG. 16 as a first step the UE receives DCI #1 and DCI #2. The UE then identifies (S22) from the DCI #1 a location of the PDSCH #1 in which the first downlink data is to be transmitted by the gNB and a location of the PDSCH #2 in which the second downlink data is to be transmitted by the gNB. The UE also identifies in this step S22 a location of the uplink resources of the corresponding PUCCH #1 and PUCCH #2 where the UE should transmit its HARQ feedback message (ACK/NACK) in response to the first and second downlink data. At decision point S24 the UE determines whether the resources of the granted PDSCH #1 and PDSCH #2 overlap in time. If they do then processing proceeds to step S26 in which the UE applies predetermined criteria or conditions for determining whether it can transmit one or both of the HARQ feedbacks on the respective PUCCH #1 and PUCCH #2 and if not, according to these criteria selects one of the PUCCH #1 or PUCCH #2. Step S26 includes the operations of steps S16, S17 and S18 of FIG. 16 At decision point S28, the UE determines whether the first PUCCH #1 or the second PUCCH #2 was selected in step S26 and correspondingly therefore whether a HARQ feedback message for first downlink data transmitted in the PDSCH #1 or the second downlink data transmitted on the PDSCH #2 can be transmitted. For example, if the UE determine in strep S26 that it can transmit only one of the HARQ feedbacks, then the UE may identify which of the PDSCH #1 or PDSCH #2 will carry the higher priority data and select to transmit the HARQ feedback on the PUCCH with the higher relative priority. If the first uplink resource for the PUCCH #1 for the HARQ feedback in response to the first downlink data was selected then processing proceeds from the decision point S28 to step S30 in which the UE receives the first downlink data on the PDSCH #1 and in step S32 generates a HARQ feedback message for transmission on the PUCCH #1. At step S34 the UE adapts the transmission of the HARQ feedback message on the PUCCH #1 to provide feedback for PDSCH #2 for example by using a different scrambling code which is known to the gNB. The process then ends at step S48.

From decision point S28, if the PUCCH #1 was not selected then processing proceeds to step S36, S38 and S40, which correspond to steps S30 to S34 described above except for the second downlink data instead of the first downlink data and generates a HARQ feedback message for transmission in the PUCCH #2 and adapts the transmission of the HARQ feedback on PUCCH #2 to provide a HARQ feedback NACK to indicated that the first downlink data transmitted on the PDSCH #1 was not received. Processing then ends at step S48.

If the PDSCH #1 and PDSCH #2 do not overlap then the UE performs steps S42 to S46 in accordance with the operations of FIG. 5 to receive the first and the second downlink data and to transmit HARQ feedback messages on the PUCCH #1 and PUCCH #2. Steps S42 to S46 also represent operations performed for step S19 in FIG. 16. The process ends at step S48. Similarly, although steps S30 and S38 indicate that the downlink data is received from the PDSCH #1 and PDSCH #2, it will be appreciated from the above explanation and the example shown in FIG. 16 that the downlink data can be received from both the PDSCH #1 and the PDSCH #2 with only one of the HARQ feedbacks transmitted in the selected PUCCH #1 or PUCCH #2.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of receiving data by a communications device in a wireless communications network, the method comprising
- receiving one or more downlink control messages providing a grant of a first downlink communications resource of a wireless access interface from which the communications device can receive first downlink data, a grant of a second downlink communications resource of the wireless access interface from which the communications device can receive second downlink data, and information of a one or more allocations of an uplink communications resource of the wireless access interface for the communications device to transmit a first hybrid automatic repeat request-type, HARQ, feedback message for indicating whether or not the first downlink data is correctly received, and information of a one or more allocations of an uplink communications resource of the wireless access interface for the communications device to transmit a second hybrid automatic repeat request-type, HARQ, feedback message for indicating whether or not the second downlink data is correctly received,
- detecting that the first downlink communications resource and the second downlink communications resource of the wireless access interface overlap in time, and
- applying one or more predetermined criteria to determine whether the communications device can transmit one or both of the first HARQ feedback message on the allocated uplink communications resource and the second HARQ feedback message on the allocated uplink communications resource, and
- in response to receiving one or both of the first downlink data from the first downlink communications resources and the second downlink data from the second downlink communications resources, transmitting the determined HARQ feedback message for one or both of the received first and second downlink data.

Paragraph 2. The method of paragraph 1, wherein the allocated uplink communications resource comprises a first uplink communications resource for transmitting the first HARQ message and a second uplink communications resource for transmitting the second HARQ message, and the one or more predetermined criteria include a requirement that the first uplink communications resource is different from the second uplink communications resource for the communications device to transmit both of the first HARQ feedback message and the second HARQ feedback message and the applying the one or more predetermined criteria comprises selecting of the first and the second HARQ feedback message to transmit if the first and the second uplink communications resources are not different.

Paragraph 3. The method of paragraph 2, wherein the one or more predetermined criteria include a restriction on a minimum temporal proximity of the first uplink communications resource for transmitting the first HARQ feedback message with respect to the second uplink communications resource for transmitting the second HARQ feedback message, and the applying the one or more predetermined criteria to determine that the communications device can transmit the first HARQ feedback or the second HARQ feedback includes determining that a temporal location of the first uplink communications resource and a temporal location of the second uplink communications resource are less than or equal the minimum temporal proximity restriction, and selecting to transmit one of the first HARQ feedback or the second HARQ feedback.

Paragraph 4. The method of paragraph 2 or 3, wherein the wireless access interface comprises a time divided structure providing communications resources in time divided units and in frequency for the uplink and the downlink, and the restriction on the minimum temporal proximity of the first uplink communications resource for transmitting the first HARQ feedback message with respect to the second uplink communications resource for transmitting the second HARQ feedback message comprises whether the first uplink resources are in the same time divided unit of the uplink wireless access interface.

Paragraph 5. The method of paragraph 2 or 3, wherein the wireless access interface comprises a time divided structure providing communications resources in time divided units and in frequency for the uplink and the downlink, and first HARQ feedback message and the second HARQ feedback message are generated by the communications device according to a first codebook or a second codebook, and the one or more predetermined criteria include a restriction on the first uplink resources being in the same time divided unit of the uplink wireless access interface and being generated by the same codebook, and the applying the one or more predetermined criteria to determine that the communications device can transmit the first HARQ feedback or the second HARQ feedback includes determining that the first uplink communications resource and the second uplink communications resource are generated using the same codebook, and selecting to transmit one of the first HARQ feedback or the second HARQ feedback.

Paragraph 6. The method of paragraph 5, wherein the time divided structure of the wireless access interface includes sub-units, and the one or more predetermined criteria include a restriction on the first uplink resources not being in the same sub-unit of the same time divided unit, the applying the one or more predetermined criteria to determine that the communications device can transmit the first HARQ feedback or the HARQ feedback includes detecting that the first uplink resources are in the same sub-unit as the second uplink resources.

Paragraph 7. The method of paragraph 5 or 6, wherein the one or more predetermined criteria include the first uplink communications resource for transmitting the first HARQ feedback message not overlapping in time with the second uplink communications resource for transmitting the second HARQ feedback message.

Paragraph 8. The method of paragraphs 1 to 7, wherein the determining whether the communications device can transmit a HARQ feedback message for one or both of the first downlink data from the first communications resource and the second downlink data from the second communications resource comprises
- determining in accordance with the predetermined criteria that a HARQ feedback message can be transmitted on either of the first downlink data from the first communications resource or the second downlink data from the second communications resource, and
- determining a relative priority of the first downlink data and the second downlink data, and selecting to transmit HARQ feedback on the first uplink communications resources or the second uplink communications resources in accordance with which of the first downlink data and the second downlink data has the higher priority.

Paragraph 9. The method of any of paragraphs 1 to 8, wherein if the first HARQ feedback message is transmitted, the transmitting the first HARQ feedback message includes adapting the first HARQ feedback message to indicate that the second downlink data was not received, and if the second HARQ feedback message is transmitted, the transmitting the second HARQ feedback message includes adapting the second HARQ feedback message to indicate that the first downlink data was not received.

Paragraph 10. The method of paragraph 9, wherein the adapting the first HARQ feedback message or the second HARQ feedback message comprises using a different scrambling code when transmitting the HARQ feedback message to that expected by the wireless communications network.

Paragraph 11. The method of any of paragraphs 1 to 10, comprising receiving the first downlink data from the first downlink communications resources, receiving the second downlink data from the second downlink communications resources and not transmitting the first HARQ feedback message in the granted uplink resources if according to the predetermined criteria the first HARQ feedback message is not selected or not transmitting the second HARQ feedback message in the granted uplink resources if according to the predetermined criteria the second HARQ feedback message is not selected.

Paragraph 12. The method of any of paragraphs 1 to 11, comprising delaying transmitting the first HARQ feedback message in the uplink resources if according to the predetermined criteria the first HARQ feedback message is not selected to be transmitted or not transmitting the second HARQ feedback message in the granted uplink resources if according to the predetermined criteria the second HARQ feedback message is not selected to be transmitted.

Paragraph 13. The method of any of paragraphs 2 to 12, comprising multiplexing the first and second HARQ feedback message and transmitting both of the first and the second HARQ feedback messages using the first uplink communications resources or the second uplink communications resources.

Paragraph 14. A method of paragraph 1, wherein the one or more allocations of an uplink communications resource comprises the same uplink communications resource.

Paragraph 15. The method of paragraph 14, wherein the first and second downlink control messages are part of a plurality of downlink control messages which grant a plurality of downlink communications resources of a shared channel of the wireless access interface for the communications device to receive a corresponding plurality of the downlink data including the first and the second downlink data, the method comprising using predetermined rules to divide the plurality of downlink communications resources into a plurality of downlink shared channel occasions, the first downlink communications resources for receiving the first downlink data being in the same downlink shared channel occasion as the second downlink communications resource for receiving the second downlink data, and the applying one or more predetermined criteria to select whether to transmit the first HARQ feedback or the second HARQ feedback comprises determining a relative priority between the first downlink data and the second downlink data, and selecting to transmit the first or the second HARQ feedback corresponding to the downlink data with the higher priority.

Paragraph 16. The method of paragraphs 14 or 15, comprising multiplexing the first and second HARQ feedback messages and transmitting both of the first and the second HARQ feedback messages in the uplink communications resource.

Paragraph 17. The method of any of paragraphs 14, 15 or 16, wherein if the first downlink data is received, the transmitting the first HARQ feedback message includes adapting the first HARQ feedback message to indicate that the second downlink data was not received, and if the second downlink data is received, the transmitting the second HARQ feedback message includes adapting the second HARQ feedback message to indicate that the first downlink data was not received.

Paragraph 18. The method of paragraph 16, wherein the adapting the first HARQ feedback message or the second HARQ feedback message comprises using a different scrambling code when transmitting the HARQ feedback message to that expected by the wireless communications network.

Paragraph 19. A method of receiving data by a communications device in a wireless communications network, the method comprising receiving one or more downlink control messages providing a grant of a first downlink communications resource of a wireless access interface from which the communications device can receive first downlink data, a grant of a second downlink communications resource of the wireless access interface from which the communications device can receive second downlink data, and information of a one or more allocations of an uplink communications resource of the wireless access interface for the communications device to transmit a first hybrid automatic repeat request-type, HARQ, feedback message for indicating whether or not the first downlink data is correctly received, and information of a one or more allocations of an uplink communications resource of the wireless access interface for the communications device to transmit a second HARQ feedback message for indicating whether or not the second downlink data is correctly received, detecting that the first downlink communications resource and the second downlink communications resource of the wireless access interface overlap in time, and applying one or more predetermined criteria to determine whether the communications device can transmit HARQ feedback message for one or both of the first HARQ feedback message for transmission on the first uplink communications resources or the second HARQ feedback message for transmission on the second uplink communications resources, receiving one or both of the first downlink data from the first downlink communications resources and the second downlink data from the second downlink communications resources, and in accordance with the determined conditions if it has been determined to transmit the first HARQ feedback message via the first uplink communications resources, adapting the first HARQ feedback message transmitted on the first uplink communications resources to provide an indication of the second HARQ feedback for the second downlink data, or if it has been determined to transmit the second HARQ feedback message via the second uplink communications resources, adapting the second HARQ feedback message transmitted on the second uplink communications resources to provide an indication of the first HARQ feedback for the first downlink data.

Paragraph 20. A communications device for receiving data from a wireless communications network, the communications device comprising receiver circuitry configured to receive signals transmitted via a wireless access interface provided by the wireless communications network, transmitter circuitry configured to transmit signals via the wireless access interface, and controller circuitry configured to control the receiver circuitry to receive one or more downlink control messages providing a grant of a first downlink communications resource of the wireless access interface from which the communications device can receive first downlink data, a grant of a second downlink communications resource of the wireless access interface from which the communications device can receive second downlink data, and a grant of a one or more allocations of an uplink communications resource of the wireless access interface for the communications device to transmit a first automatic repeat request-type, HARQ, feedback message for indicating whether or not the first downlink data is received and to transmit a second automatic repeat request-type feedback message for indicating whether or not the second downlink data is received, the controller circuitry being configured to detect that the first downlink communications resource and the second downlink communications resource of the wireless access interface overlap in time, to apply one or more predetermined criteria to determine whether the communications device can transmit one or both of the first HARQ feedback message on the allocated uplink communications resource and the second HARQ feedback message on the allocated uplink communications resource, and to control the receiver circuitry in accordance with the applied predetermined criteria to receive one or both of the first downlink data and the second downlink data, and to control the transmitter circuitry to transmit the determined HARQ feedback message for one or both of the received first and second downlink data.

Paragraph 21. A communications device for receiving data from a wireless communications network, the communications device comprising receiver circuitry configured to receive signals transmitted via a wireless access interface provided by the wireless communications network, transmitter circuitry configured to transmit signals via the wireless access interface, and controller circuitry configured to control the receiver circuitry to receive one or more downlink control messages providing a grant of a first downlink communications resource of a wireless access interface from which the communications device can receive first downlink data, a grant of a second downlink communications resource of the wireless access interface from which the communications device can receive second downlink data, and information of a one or more allocations of an uplink communications resource of the wireless access interface for the communications device to transmit a first hybrid automatic repeat request-type, HARQ, feedback message for indicating whether or not the first downlink data is correctly received, and information of a one or more allocations of an uplink communications resource of the wireless access interface for the communications device to transmit a second HARQ feedback message for indicating whether or not the second downlink data is correctly received, the controller circuitry being configured to detect that the first downlink communications resource and the second downlink communications resource of the wireless access interface overlap in time, and to apply one or more predetermined criteria to determine whether the communications device can transmit HARQ feedback message for one or both of the first HARQ feedback message for transmission on the first uplink communications resources or the second HARQ feedback message for transmission on the second uplink communications resources, and to control the receiver circuitry to receive one or both of the first downlink data from the first downlink communications resources and the second downlink data from the second downlink communications resources, and in accordance with the determined conditions if it has been determined to transmit the first HARQ feedback message via the first uplink communications resources, to adapt the first HARQ feedback message transmitted on the first uplink communications resources to provide an indication of the second HARQ feedback for the second downlink data, or if it has been determined to transmit the second HARQ feedback message via the second uplink communications resources, to adapt the second HARQ feedback message transmitted on the second uplink communications resources to provide an indication of the first HARQ feedback for the first downlink data.

Paragraph 22. A method of operating an infrastructure equipment of a wireless communications network to transmit data to a communications device, the method comprising transmitting one or more downlink control messages to the communications device providing an indication of a first downlink communications resource of a wireless access interface from which the communications device can receive first downlink data, an indication of a second downlink communications resource of the wireless access interface from which the communications device can receive second downlink data, and an indication of one or more allocations of an uplink communications resource of the wireless access interface for the communications device to transmit a first automatic repeat request-type, HARQ, feedback message for indicating whether or not the first downlink data is received and to transmit a second HARQ feedback message for indicating whether or not the second downlink data is received, identifying that the first downlink communications resource and the second downlink communications resource of the wireless access interface overlap in time, and receiving either the first HARQ feedback message in the granted uplink communications resource indicating whether or not the first downlink data was received, or receiving the second HARQ feedback message in the granted uplink communications resource to indicate whether or not the second downlink data was received, and identifying from either the received first HARQ feedback message that the second downlink data was not received or from the received second HARQ feedback message that the first downlink data was not received.

Paragraph 23. An infrastructure equipment forming part of a wireless communications network, the infrastructure equipment comprising
receiver circuitry configured to receive signals transmitted from one or more communications devices via a wireless access interface provided by the wireless communications network,
transmitter circuitry configured to transmit signals to the one or more communications devices via the wireless access interface, and
controller circuitry configured to control the transmitter circuitry
to transmit one or more downlink control messages to the communications device providing an indication of a first downlink communications resource of a wireless access interface from which the communications device can receive first downlink data, an indication of a second downlink communications resource of the wireless access interface from which the communications device can receive second downlink data, and an indication of a one or more allocations of an uplink communications resource of the wireless access interface for the communications device to transmit a first automatic repeat request-type, HARQ, feedback message for indicating whether or not the first downlink data is received and to transmit a second automatic repeat request-type feedback message for indicating whether or not the second downlink data is received, and the controller circuitry is configured
to identify that the first downlink communications resource and the second downlink communications resource of the wireless access interface overlap in time, and
to receive either the first HARQ feedback message in the granted uplink communications resource indicating whether or not the first downlink data was received, or
to receive the second HARQ feedback message in the granted uplink communications resource to indicate whether or not the second downlink data was received, and
to identify from either the received first HARQ feedback message that the second downlink data was not received or from the received second HARQ feedback message that the first downlink data was not received.

Paragraph 24. Circuitry for receiving data from a wireless communications network, the circuitry comprising
receiver circuitry configured to receive signals transmitted via a wireless access interface provided by the wireless communications network,
transmitter circuitry configured to transmit signals via the wireless access interface, and
controller circuitry configured to control the receiver circuitry
to receive one or more downlink control messages providing a grant of a first downlink communications resource of the wireless access interface from which the communications device can receive first downlink data, a grant of a second downlink communications resource of the wireless access interface from which the communications device can receive second downlink data, and a grant of a one or more allocations of an uplink communications resource of the wireless access interface for the communications device to transmit a first automatic repeat request-type, HARQ, feedback message for indicating whether or not the first downlink data is received and to transmit a second automatic repeat request-type feedback message for indicating whether or not the second downlink data is received, the controller circuitry being configured
to detect that the first downlink communications resource and the second downlink communications resource of the wireless access interface overlap in time,
to apply one or more predetermined criteria to determine whether the communications device can transmit one or both of the first HARQ feedback message on the allocated uplink communications resource and the second HARQ feedback message on the allocated uplink communications resource, and
to control the receiver circuitry in accordance with the applied predetermined criteria to receive one or both of the first downlink data and the second downlink data, and to control the transmitter circuitry
to transmit the determined HARQ feedback message for one or both of the received first and second downlink data.

Paragraph 25. Circuitry for receiving data from a wireless communications network, the circuitry comprising
receiver circuitry configured to receive signals transmitted via a wireless access interface provided by the wireless communications network,
transmitter circuitry configured to transmit signals via the wireless access interface, and
controller circuitry configured to control the receiver circuitry
to receive one or more downlink control messages providing a grant of a first downlink communications resource of a wireless access interface from which the communications device can receive first downlink data, a grant of a second downlink communications resource of the wireless access interface from which the communications device can receive second downlink data, and information of a one or more allocations of an uplink communications resource of the wireless access interface for the communications device to transmit a first hybrid automatic repeat request-type, HARQ, feedback message for indicating whether or not the first downlink data is correctly received, and information of a one or more allocations of an uplink communications resource of the wireless access interface for the communications device to transmit a second HARQ feedback message for indicating whether or not the second downlink data is correctly received, the controller circuitry being configured
to detect that the first downlink communications resource and the second downlink communications resource of the wireless access interface overlap in time, and
to apply one or more predetermined criteria to determine whether the communications device can transmit HARQ feedback message for one or both of the first HARQ feedback message for transmission on the first uplink communications resources or the second HARQ feedback message for transmission on the second uplink communications resources, and to control the receiver circuitry
to receive one or both of the first downlink data from the first downlink communications resources and the second downlink data from the second downlink communications resources, and
in accordance with the determined conditions if it has been determined to transmit the first HARQ feedback message via the first uplink communications resources, to adapt the first HARQ feedback message transmitted on the first uplink communications resources to provide an indication of the second HARQ feedback for the second downlink data, or if it has been determined to transmit the second HARQ feedback message via the second uplink communications resources, to adapt the second HARQ feedback message transmitted on the second uplink communications resources to provide an indication of the first HARQ feedback for the first downlink data.

Paragraph 26. Circuitry forming part of a wireless communications network, the circuitry comprising receiver circuitry configured to receive signals transmitted from one or more communications devices via a wireless access interface provided by the wireless communications network, transmitter circuitry configured to transmit signals to the one or more communications devices via the wireless access interface, and controller circuitry configured to control the transmitter circuitry to transmit one or more downlink control messages to the communications device providing an indication of a first downlink communications resource of a wireless access interface from which the communications device can receive first downlink data, an indication of a second downlink communications resource of the wireless access interface from which the communications device can receive second downlink data, and an indication of a one or more allocations of an uplink communications resource of the wireless access interface for the communications device to transmit a first automatic repeat request-type, HARQ, feedback message for indicating whether or not the first downlink data is received and to transmit a second automatic repeat request-type feedback message for indicating whether or not the second downlink data is received, and the controller circuitry is configured to identify that the first downlink communications resource and the second downlink communications resource of the wireless access interface overlap in time, and to receive either the first HARQ feedback message in the granted uplink communications resource indicating whether or not the first downlink data was received, or to receive the second HARQ feedback message in the granted uplink communications resource to indicate whether or not the second downlink data was received, and to identify from either the received first HARQ feedback message that the second downlink data was not received or from the received second HARQ feedback message that the first downlink data was not received.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.

[2] Holma H. and Toskala A, "LTE for UMTS OFDMA and SC-FDMA based radio access", John Wiley and Sons, 2009

[3] 3GPP TS 38.321, "Medium Access Control (MAC) protocol specification (Rel-15)", v15.3.0

[4] 3GPP TS 38.214 "NR; Physical layer procedures for data (Release 15)", version 15.2.0

[5] R2-1818795, "LS on Intra-UE Prioritization/Multiplexing," RAN2, RAN2 #104

[6] RP-182089, "Study on physical layer enhancements for NR ultra-reliable and low latency communication (URLLC)," Huawei, HiSilicon, Nokia, Nokia Shanghai Bell, RAN #81

[7] RP-190726, "New WID: Physical Layer Enhancements for NR Ultra-Reliable and Low Latency Communication (URLLC)," Huawei, HiSilicon, RAN #83

[8] 3GPP TR38.824, "Study on physical layer enhancements for NR ultra-reliable and low latency ca se (URLLC) (Rel-16)", v1.2.0

[9] European patent application 19166662.7 "HARQ-ACK Prioritisation for multiple HARQ-ACK codebook"

Annex 1

LTE Wireless Access Interface

Embodiments of the present technique are not limited to a particular wireless communications standard, but find general application with a mobile communications system in which a transmitter and a receiver are configured to communicate data in units, transport blocks or packets for which some indication of feedback is provided as part of an ARQ type protocol. However, the following example embodiments will be explained with reference to a 3GPP defined LTE architecture. Those acquainted with LTE will appreciate that a wireless access interface configured in accordance with an LTE standard uses an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 17 and 18.

FIG. 18 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 18, the resources of the wireless access interface are also temporally divided into frames where a frame 200 lasts 10 ms and is subdivided into 10 sub-frames 1201 each with a duration of 1 ms. Each sub-frame 201 is formed from 14 OFDM symbols and is divided into two slots 1220, 1222 each of which comprise six or seven OFDM symbols depending on whether a normal or extended cyclic prefix is being utilised within OFDM symbols for the reduction of inter symbol interference. The resources within a slot may be divided into resources blocks 1203 each comprising 12 subcarriers for the duration of one slot and the resource blocks are further divided into resource elements 1204 which span one subcarrier for one OFDM symbol, where each rectangle 1204 represents a resource element. The resource elements distributed in time within a sub-frame and frequency across the host system bandwidth represent the communications resources of the host system.

The simplified structure of the downlink of an LTE wireless access interface presented in FIG. 14, also includes an illustration of each sub-frame 1201, which comprises a control region 1205 for the transmission of control data, a data region 1206 for the transmission of user data and reference signals 207 which are interspersed in the control and data regions in accordance with a predetermined pattern. The control region 1205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 14, UE1 has been allocated resources 1208 of the data region 1206, UE2 resources 1209 and UE3 resources 1210. UEs in an LTE system may be allocated a fraction of the available resources for the PDSCH and therefore UEs are required to be informed of the location of their allocated resources within the PDSCH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 19:
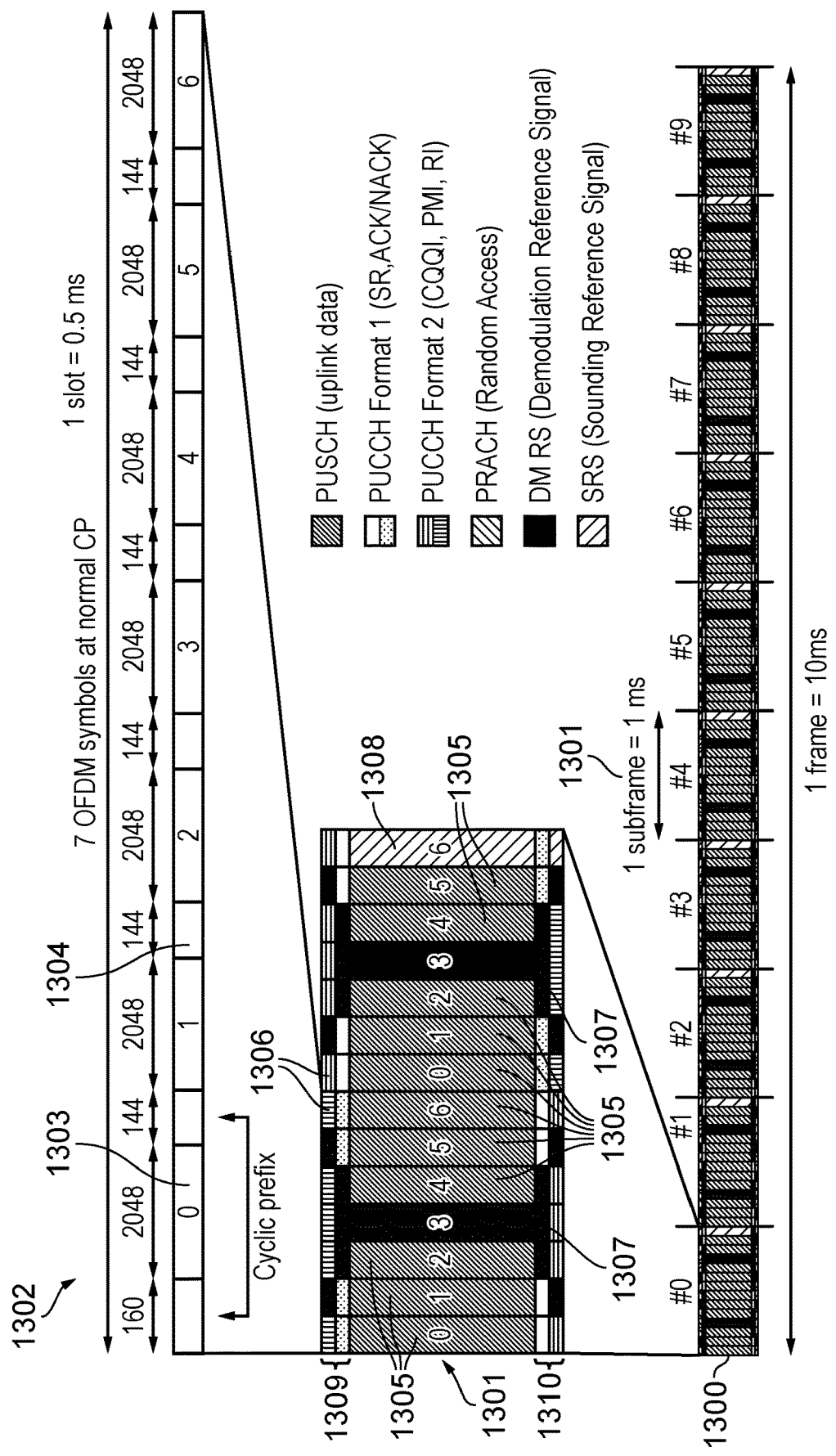
FIG. 19 is a schematic representation of an uplink of a wireless access interface according to the 3GPP LTE standard.

FIG. 19 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 3 illustrates such an uplink frame in an FDD implementation. A frame 1300 is divided into 10 sub-frames 1301 of 1 ms duration where each sub-frame 1301 comprises two slots 1302 of 0.5 ms duration. Each slot 1302 is then formed from seven OFDM symbols 1303 where a cyclic prefix 304 is inserted between each symbol in a manner equivalent to that in downlink sub-frames.

As shown in FIG. 19, each LTE uplink sub-frame may include a plurality of different channels, for example a physical uplink communications channel (PUSCH) 1305, a physical uplink control channel (PUCCH) 1306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 1307 and sounding reference signals (SRS) 1308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 1309 and lower 1310 subcarriers/frequencies/resource blocks of an uplink sub-frame are reserved for control signalling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made, contiguous frequency allocations for each UE may be preferable.

The invention claimed is:

1. A method of receiving data by a communications device in a wireless communications network, the method comprising:
   receiving one or more downlink control messages providing a grant of a first downlink communications resource of a wireless access interface from which the communications device can receive first downlink data, a grant of a second downlink communications resource of the wireless access interface from which the communications device can receive second downlink data, and information of a one or more allocations of an uplink communications resource of the wireless access interface for the communications device to transmit a first hybrid automatic repeat request-type (HARQ) feedback message for indicating whether or not the first downlink data is correctly received, and information of a one or more allocations of an uplink communications resource of the wireless access interface for the communications device to transmit a second hybrid automatic repeat request-type (HARQ) feedback message, separate from the first HARQ feedback message, for indicating whether or not the second downlink data is correctly received,
   detecting that the first downlink communications resource and the second downlink communications resource of the wireless access interface overlap in time, and
   applying one or more predetermined criteria to determine whether the communications device can transmit one or both of the first HARQ feedback message on the allocated uplink communications resource and the second HARQ feedback message on the allocated uplink communications resource, and
   in response to receiving one or both of the first downlink data from the first downlink communications resources and the second downlink data from the second downlink communications resources, transmitting the determined HARQ feedback message for one or both of the received first and second downlink data.

2. The method of claim 1, wherein the allocated uplink communications resource comprises a first uplink communications resource for transmitting the first HARQ message and a second uplink communications resource for transmitting the second HARQ message, and the one or more predetermined criteria include a requirement that the first uplink communications resource is different from the second uplink communications resource for the communications device to transmit both of the first HARQ feedback message and the second HARQ feedback message and the applying the one or more predetermined criteria comprises selecting of the first and the second HARQ feedback message to transmit in a case that the first and the second uplink communications resources are not different.

3. The method of claim 2, wherein the one or more predetermined criteria include a restriction on a minimum temporal proximity of the first uplink communications resource for transmitting the first HARQ feedback message with respect to the second uplink communications resource for transmitting the second HARQ feedback message, and the applying the one or more predetermined criteria to determine that the communications device can transmit the first HARQ feedback or the second HARQ feedback includes determining that a temporal location of the first uplink communications resource and a temporal location of the second uplink communications resource are less than or equal the minimum temporal proximity restriction, and selecting to transmit one of the first HARQ feedback or the second HARQ feedback.

4. The method of claim 2, wherein the wireless access interface comprises a time divided structure providing communications resources in time divided units and in frequency for the uplink and the downlink, and the restriction on the minimum temporal proximity of the first uplink communications resource for transmitting the first HARQ feedback message with respect to the second uplink communications resource for transmitting the second HARQ feedback message comprises whether the first uplink resources are in the same time divided unit of the uplink wireless access interface.

5. The method of claim 2, wherein the wireless access interface comprises a time divided structure providing communications resources in time divided units and in frequency for the uplink and the downlink, and first HARQ feedback message and the second HARQ feedback message are generated by the communications device according to a first codebook or a second codebook, and the one or more predetermined criteria include a restriction on the first uplink resources being in the same time divided unit of the uplink wireless access interface and being generated by the same codebook, and the applying the one or more predetermined criteria to determine that the communications device can transmit the first HARQ feedback or the second HARQ feedback includes determining that the first uplink communications resource and the second uplink communications resource are generated using the same codebook, and selecting to transmit one of the first HARQ feedback or the second HARQ feedback.

6. The method of claim 5, wherein the time divided structure of the wireless access interface includes sub-units, and the one or more predetermined criteria include a restriction on the first uplink resources not being in the same sub-unit of the same time divided unit, the applying the one or more predetermined criteria to determine that the communications device can transmit the first HARQ feedback or the HARQ feedback includes detecting that the first uplink resources are in the same sub-unit as the second uplink resources.

7. The method of claim 5, wherein the one or more predetermined criteria include the first uplink communications resource for transmitting the first HARQ feedback message not overlapping in time with the second uplink communications resource for transmitting the second HARQ feedback message.

8. The method of claim 2, comprising multiplexing the first and second HARQ feedback message and transmitting both of the first and the second HARQ feedback messages using the first uplink communications resources or the second uplink communications resources.

9. The method of claim 1, wherein the determining whether the communications device can transmit a HARQ feedback message for one or both of the first downlink data from the first communications resource and the second downlink data from the second communications resource comprises:
 determining in accordance with the predetermined criteria that a HARQ feedback message can be transmitted on either of the first downlink data from the first communications resource or the second downlink data from the second communications resource, and
 determining a relative priority of the first downlink data and the second downlink data, and
 selecting to transmit HARQ feedback on the first uplink communications resources or the second uplink communications resources in accordance with which of the first downlink data and the second downlink data has the higher priority.

10. The method of claim 1, wherein in a case that the first HARQ feedback message is transmitted, the transmitting the first HARQ feedback message includes adapting the first HARQ feedback message to indicate that the second downlink data was not received, and in a case that the second HARQ feedback message is transmitted, the transmitting the second HARQ feedback message includes adapting the second HARQ feedback message to indicate that the first downlink data was not received.

11. The method of claim 10, wherein the adapting the first HARQ feedback message or the second HARQ feedback message comprises using a different scrambling code when transmitting the HARQ feedback message to that expected by the wireless communications network.

12. The method of claim 1, comprising receiving the first downlink data from the first downlink communications resources, receiving the second downlink data from the second downlink communications resources and not transmitting the first HARQ feedback message in the granted uplink resources in a case that according to the predetermined criteria the first HARQ feedback message is not selected or not transmitting the second HARQ feedback message in the granted uplink resources in a case that according to the predetermined criteria the second HARQ feedback message is not selected.

13. The method of claim 1, comprising delaying transmitting the first HARQ feedback message in the uplink resources in a case that according to the predetermined criteria the first HARQ feedback message is not selected to be transmitted or not transmitting the second HARQ feedback message in the granted uplink resources in a case that according to the predetermined criteria the second HARQ feedback message is not selected to be transmitted.

14. The method of claim 1, wherein the one or more allocations of an uplink communications resource comprises the same uplink communications resource.

15. The method of claim 14, wherein the first and second downlink control messages are part of a plurality of downlink control messages which grant a plurality of downlink communications resources of a shared channel of the wireless access interface for the communications device to receive a corresponding plurality of the downlink data including the first and the second downlink data, the method comprising:
 using predetermined rules to divide the plurality of downlink communications resources into a plurality of downlink shared channel occasions, the first downlink communications resources for receiving the first downlink data being in the same downlink shared channel occasion as the second downlink communications resource for receiving the second downlink data, and the applying one or more predetermined criteria to select whether to transmit the first HARQ feedback or the second HARQ feedback comprises:
 determining a relative priority between the first downlink data and the second downlink data, and
 selecting to transmit the first or the second HARQ feedback corresponding to the downlink data with the higher priority.

16. The method of claim 14, comprising multiplexing the first and second HARQ feedback messages and transmitting both of the first and the second HARQ feedback messages in the uplink communications resource.

17. The method of claim 16, wherein the adapting the first HARQ feedback message or the second HARQ feedback message comprises using a different scrambling code when transmitting the HARQ feedback message to that expected by the wireless communications network.

18. The method of claim 14, wherein in a case that the first downlink data is received, the transmitting the first HARQ feedback message includes adapting the first HARQ feedback message to indicate that the second downlink data was not received, and in a case that the second downlink data is received, the transmitting the second HARQ feedback message includes adapting the second HARQ feedback message to indicate that the first downlink data was not received.

19. A communications device for receiving data from a wireless communications network, the communications device comprising:
 receiver circuitry configured to receive signals transmitted via a wireless access interface provided by the wireless communications network,
 transmitter circuitry configured to transmit signals via the wireless access interface, and
 controller circuitry configured to control the receiver circuitry
  to receive one or more downlink control messages providing a grant of a first downlink communications resource of the wireless access interface from which the communications device can receive first downlink data, a grant of a second downlink communications resource of the wireless access interface from which the communications device can receive second downlink data, and a grant of a one or more allocations of an uplink communications resource of the wireless access interface for the communications device to transmit a first automatic repeat request-type (HARQ) feedback message for indicating whether or not the first downlink data is received and to transmit a second automatic repeat request-type (HARQ) feedback message, separate from the first HARQ feedback message, for indicating whether or not the second downlink data is received, the controller circuitry being configured to detect that the first downlink communications resource and the second downlink communications resource of the wireless access interface overlap in time, to apply one or more predetermined criteria to determine whether the communications device can transmit one or both of the first HARQ feedback message on the allocated uplink communications resource and the second HARQ feedback message on the allocated uplink communications resource, and to control the receiver circuitry in accordance with the applied predetermined criteria to receive one or both of the first downlink data and the second downlink data, and to control the transmitter circuitry to transmit the determined HARQ feedback message for one or both of the received first and second downlink data.

20. A communications device for receiving data from a wireless communications network, the communications device comprising:

receiver circuitry configured to receive signals transmitted via a wireless access interface provided by the wireless communications network, transmitter circuitry configured to transmit signals via the wireless access interface, and controller circuitry configured to control the receiver circuitry to receive one or more downlink control messages providing a grant of a first downlink communications resource of a wireless access interface from which the communications device can receive first downlink data, a grant of a second downlink communications resource of the wireless access interface from which the communications device can receive second downlink data, and information of a one or more allocations of an uplink communications resource of the wireless access interface for the communications device to transmit a first hybrid automatic repeat request-type (HARQ) feedback message for indicating whether or not the first downlink data is correctly received, and information of a one or more allocations of an uplink communications resource of the wireless access interface for the communications device to transmit a second HARQ feedback message, separate from the first HARQ feedback message, for indicating whether or not the second downlink data is correctly received, the controller circuitry being configured to detect that the first downlink communications resource and the second downlink communications resource of the wireless access interface overlap in time, and to apply one or more predetermined criteria to determine whether the communications device can transmit HARQ feedback message for one or both of the first HARQ feedback message for transmission on the first uplink communications resources or the second HARQ feedback message for transmission on the second uplink communications resources, and to control the receiver circuitry to receive one or both of the first downlink data from the first downlink communications resources and the second downlink data from the second downlink communications resources, and in accordance with the determined conditions in a case that it has been determined to transmit the first HARQ feedback message via the first uplink communications resources, to adapt the first HARQ feedback message transmitted on the first uplink communications resources to provide an indication of the second HARQ feedback for the second downlink data, or in a case that it has been determined to transmit the second HARQ feedback message via the second uplink communications resources, to adapt the second HARQ feedback message transmitted on the second uplink communications resources to provide an indication of the first HARQ feedback for the first downlink data.

* * * * *